(12) United States Patent
Yurko et al.

(10) Patent No.: US 11,654,868 B2
(45) Date of Patent: May 23, 2023

(54) VACUUM CLEANER TO BE INSTALLED IN A VEHICLE

(71) Applicant: SHOP VAC CORPORATION, Williamsport, PA (US)

(72) Inventors: Michael Z. Yurko, Endicott, NY (US); Neil N. Norell, Candor, NY (US)

(73) Assignee: SHOP VAC CORPORATION, Williamsport, PA (US)

( * ) Notice: Subject to any disclaimer, the term of this patent is extended or adjusted under 35 U.S.C. 154(b) by 979 days.

(21) Appl. No.: 16/305,842

(22) PCT Filed: Jul. 18, 2017

(86) PCT No.: PCT/US2017/042616
§ 371 (c)(1),
(2) Date: Nov. 29, 2018

(87) PCT Pub. No.: WO2018/017579
PCT Pub. Date: Jan. 25, 2018

(65) Prior Publication Data
US 2020/0317162 A1    Oct. 8, 2020

Related U.S. Application Data

(60) Provisional application No. 62/489,871, filed on Apr. 25, 2017, provisional application No. 62/474,293,
(Continued)

(51) Int. Cl.
*B60S 1/64* (2006.01)
*A47L 7/00* (2006.01)
*A47L 5/38* (2006.01)

(52) U.S. Cl.
CPC .............. *B60S 1/64* (2013.01); *A47L 7/0076* (2013.01); *A47L 5/38* (2013.01)

(58) Field of Classification Search
CPC ............. B60S 1/64; A47L 7/0076; A47L 5/38
See application file for complete search history.

(56) References Cited

U.S. PATENT DOCUMENTS

| 5,189,753 A | 3/1993 | Sousa et al. |
| 5,829,091 A | 11/1998 | Ingram et al. |

(Continued)

FOREIGN PATENT DOCUMENTS

| EP | 0657587 A1 | 6/1995 |
| EP | 0674869 A1 | 10/1995 |

(Continued)

OTHER PUBLICATIONS

International Preliminary Report on Patentability and Written Opinion, corresponding to International Application No. PCT/US2017/042592, dated Jan. 22, 2019.

(Continued)

*Primary Examiner* — David Redding
(74) *Attorney, Agent, or Firm* — Marshall, Gerstein & Borun LLP

(57) ABSTRACT

Vacuum cleaners to be mounted in a vehicle are disclosed. Some of the vacuum cleaners have a modular design that allow the vacuum cleaners to be arranged, assembled, and/or installed in different configurations and to fit in different spaces within the vehicle. Vacuum cleaners may include a vacuum module, a collector module, and/or a hose storage module. An interconnecting duct is configured to operatively couple the vacuum module and the collector module in any one of a plurality of different predefined assembly configurations. The collector module may have a debris canister that may be lifted straight out of a collector housing. The vacuum cleaner may be installed in a vehicle in a manner to allow easy removal of the debris canister without disconnecting and/or removing other portions of the vacuum cleaner.

16 Claims, 22 Drawing Sheets

Related U.S. Application Data filed on Mar. 21, 2017, provisional application No. 62/379,129, filed on Aug. 24, 2016, provisional application No. 62/364,183, filed on Jul. 19, 2016.

(56) References Cited

U.S. PATENT DOCUMENTS

| | | |
|---|---|---|
| 6,128,804 A | 10/2000 | Lee et al. |
| 6,148,472 A | 11/2000 | Arena |
| 6,490,751 B2 | 12/2002 | Ganzenmuller |
| 6,553,610 B1 | 4/2003 | Shideler |
| 6,813,805 B2 | 11/2004 | Ganzenmuller |
| 7,152,272 B2 | 12/2006 | Rukavina et al. |
| 7,266,859 B2 | 9/2007 | Slone |
| 7,480,957 B2 | 1/2009 | Ganzenmuller, V |
| 8,347,452 B2 | 1/2013 | Maehata et al. |
| 8,615,845 B2 | 12/2013 | Norell et al. |
| 9,499,134 B2 | 11/2016 | Camiller |
| 9,751,504 B2 | 9/2017 | Schultz et al. |
| 10,099,659 B1 | 10/2018 | Williams et al. |
| 2003/0167590 A1 | 9/2003 | Oh |
| 2003/0217432 A1 | 11/2003 | Oh et al. |
| 2004/0107528 A1 | 6/2004 | LeClear et al. |
| 2004/0134013 A1 | 7/2004 | Slone |
| 2005/0011035 A1 | 1/2005 | Rukavina et al. |
| 2005/0066468 A1 | 3/2005 | Ganzenmuller |
| 2005/0273969 A1 | 12/2005 | Watson et al. |
| 2006/0080801 A1 | 4/2006 | Nameth |
| 2006/0085940 A1 | 4/2006 | Chernoff |
| 2010/0005612 A1 | 1/2010 | Moore |
| 2010/0083457 A1 | 4/2010 | Norell et al. |
| 2010/0242206 A1 | 9/2010 | Maehata et al. |
| 2012/0210536 A1 | 8/2012 | Jan et al. |
| 2014/0130293 A1 | 5/2014 | Lee et al. |
| 2015/0307066 A1 | 10/2015 | Camiller |
| 2016/0068141 A1 | 3/2016 | Schultz et al. |
| 2016/0368461 A1 | 12/2016 | Logli, Jr. et al. |

FOREIGN PATENT DOCUMENTS

| | | |
|---|---|---|
| WO | WO-91/18773 A1 | 12/1991 |
| WO | WO-2006/088434 A1 | 8/2006 |
| WO | WO-2017/031030 A1 | 2/2017 |

OTHER PUBLICATIONS

International Preliminary Report on Patentability and Written Opinion, corresponding to International Application No. PCT/US2017/042602, dated Jan. 22, 2019.

International Preliminary Report on Patentability and Written Opinion, corresponding to International Application No. PCT/US2017/042616, dated Jan. 22, 2019.

European Search Report and Opinion for European Application No. 18162948.6, dated Jul. 26, 2018.

International Search Report and Written Opinion, corresponding International Application No. PCT/US2017/042592, dated Mar. 19, 2018.

International Search Report and Written Opinion, corresponding International Application No. PCT/US2017/042602, dated Feb. 26, 2018.

International Search Report and Written Opinion, corresponding International Application No. PCT/US2017/042616, dated Mar. 3, 2018.

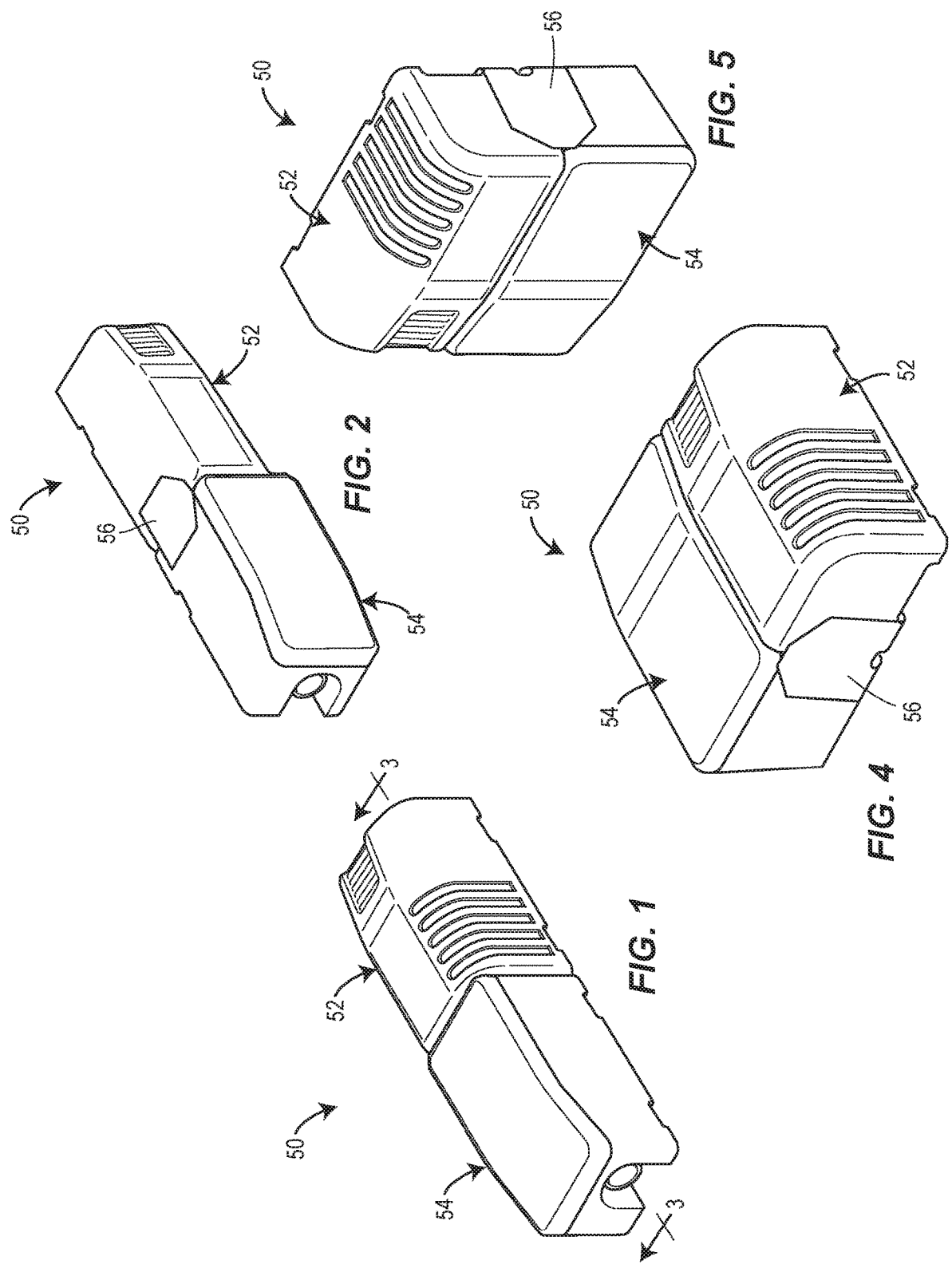

VACUUM CLEANER TO BE INSTALLED IN A VEHICLE

FIELD OF THE INVENTION

The present invention relates generally to a vacuum cleaner configured to be mounted in a vehicle.

BACKGROUND

In order to clean a vehicle, such as a car or truck, a vacuum cleaner is often used to vacuum out dirt and debris. However, it can be awkward and/or inconvenient to use a typical in-home vacuum cleaner to clean out the interior of a vehicle. To address this inconvenience, attempts have been made to permanently install on-board vehicle vacuum cleaners inside the vehicle. However, the known on-board vehicle vacuum cleaners typically have complex and inconvenient installation arrangements, which limit their usage.

SUMMARY

It is an object of the present disclosure to provide one or more vacuum cleaners to be mounted in a vehicle that improve upon previously known on-board vehicle vacuum cleaners.

According to some aspects of the present disclosure, a vacuum cleaner configured to be mounted in a vehicle includes a vacuum module configured to draw a vacuum and a collector module configured to collect debris from air drawn by the vacuum module. The vacuum module may include a motor/impeller unit disposed within a motor housing. The collector module may include a collector housing attached to the motor housing and a debris canister removably disposed in the collector housing. The collector module may be disposed side by side adjacent to the vacuum module. The collector housing may have a circumferential side wall defining a top opening into an interior space. The debris canister may slide into an operative position in the interior space the collector housing through the top opening.

According to some aspects of the present disclosure, an automobile with a vacuum cleaner includes a console disposed in a passenger compartment of the vehicle, such as a between a driver's seat and a front passenger seat, and a vacuum cleaner according to any one of the exemplary arrangements disclosed herein disposed in a console between the two seats. For example, the vacuum cleaner may include a vacuum module configured to draw a vacuum, wherein the vacuum module includes a motor/impeller unit disposed within a motor housing, and a collector module configured to collect debris from air drawn by the vacuum module, wherein the collector module includes a collector housing attached to the motor housing and a debris canister removably disposed in the collector housing. The motor housing and the collector housing may be secured to a portion of the passenger compartment.

According to another aspect of the present disclosure, an automobile with a vacuum cleaner comprises a console having a back, an accessible top opening and two sides. The two sides are disposed between two seats in a passenger compartment of the vehicle. A vacuum cleaner is disposed in the console and comprises a motor and an impeller. A debris canister may be operatively connected to the impeller so that the impeller draws air through the debris canister. A hose may be connected to the canister through an opening in the back of the console. The debris canister is removable through the accessible top opening of the console.

According to yet another aspect of the present disclosure, a vacuum cleaner comprises a vacuum module configured to draw a vacuum, and the vacuum module includes a motor/impeller unit disposed within a motor housing. A collector module is configured to collect debris from air drawn by the vacuum module and includes a collector housing attached to the motor housing and a debris canister removably disposed in the collector housing. The motor housing and the collector housing are adapted to be disposed within a console of an automobile.

In further accordance with any one or more of the foregoing aspects and exemplary arrangements, a vacuum cleaner according to the teachings of the present disclosure may include any one or more of the following optional features and/or arrangements in any functionally useful combination.

The vacuum module may include a motor/impeller unit disposed within a motor housing. The motor/impeller unit may include an electric motor, an impeller assembly, and a controller. The motor/impeller unit may further include power electronics and/or a heat sink. In some arrangements, the power electronics and/or the heat sink is disposed at opposing perpendicular angles relative to a printed circuit board (PCB) of the controller. The impeller assembly and the motor may be axially aligned in-line with each other. Any heat sink may also be axially aligned with the impeller assembly and the motor. The controller and the power electronics and/or the heat sink may be arranged in a saddle-shaped arrangement over and/or around the motor. A motor/impeller unit according to one or more of these features can provide a relatively small package outline, which may be useful for minimizing and/or increasing the possible installation arrangements within a vehicle. The vacuum module may include an intake receiver configured to receive at least one end of the interconnecting duct.

The collector module may include a collector housing and a debris canister removably disposed in the collector housing. The debris canister may be configured to be slidably removed from and/or reinserted into the collector housing. The collector module may include a mounting bracket. The motor/impeller unit may be attached to the collector module with the mounting bracket. The collector housing may include a hose connector coupled to an air inlet. The hose connector may be configured to be coupled to a vacuum hose. A vacuum hose may be coupled to the hose connector. The vacuum hose may be flexible. The collector housing may have a circumferential side wall defining a top opening into an interior space, and the debris canister may slide into an operative position in the interior space the collector housing through the top opening.

The interconnecting duct may have a substantially rigid body that forms a fluid flow duct in the form of a U-shaped tube extending from a first duct opening at a first end of the tube to a second duct opening at a second end of the tube.

The vacuum module and the collector module may be configured to fit into a space between two seats of the vehicle when operatively coupled together. The vacuum module and the collector module may be configured to fit within a console housing. The console housing may be a center console.

A hose connector may project outwardly from a side wall of the collector housing. The hose connector may include a hollow tube and a hose coupling carried by the hollow tube. The interconnecting duct may project from a side wall of the collector housing and fluidly connect the collector housing with the motor/impeller unit. The hose connector may be disposed on an opposite side of the collector housing from the vacuum module and/or the interconnecting duct.

The debris canister may include a peripheral side wall extending up from a bottom wall and define an interior space. The debris canister may have a dirty air intake port and a clean air outlet port. The dirty air intake port and/or the clean air outlet port may be disposed through the peripheral sidewall. The dirty air intake port may be defined through a first slanted overhang section of the peripheral sidewall. The clean air exhaust port may be defined through a second slanted overhang section of the peripheral sidewall. The first slanted overhang section may fluidly mate to the hose connector. The second slanted overhang section may fluidly mate to the interconnecting duct.

The collector housing may have a peripheral sidewall that includes a first slanted shoulder portion from which the hose connector projects and/or a second slanted shoulder portion from which the connector duct projects. The first slanted overhang section of the debris canister peripheral sidewall may mate on top of the first slanted shoulder portion of the collector housing peripheral sidewall. The second slanted overhang section of the debris canister peripheral sidewall may mate on top of the second slanted shoulder portion of the collector housing peripheral sidewall. The first and second slanted overhang portions and the first and second slanted shoulder portions may be slanted and an angle of about 45° from vertical portions of the respective sidewalls. However, other angles may also be used.

An exterior side of the debris canister sidewall may define a first vertical recess extending from the first slanted overhang to the bottom wall and/or a second vertical recess extending from the second slanted overhang to the bottom wall. As the debris canister slides into the operative position inside the collector housing, the first slanted shoulder may slide up into the first vertical recess and/or the second slanted shoulder may slide up into the second vertical recess.

One or more seals, such as compression gaskets, may form one or more seals between the debris canister and the collector housing around the various openings. For example, a gasket may be arranged and positioned to form a seal around the dirty air intake port between the first slanted shoulder and the first slanted overhang. Similarly, a gasket may be arranged and positioned to form a seal around the clear air exhaust port between the second slanted shoulder and the second slanted overhang. The seals may provide improved efficiency of the vacuum cleaner by preventing unwanted air intake along the air flow path from the hose connector to the impeller assembly.

A filter, such as a screen or filter media, may be arranged to prevent dirt and/or debris from being drawn from the debris canister into the motor/impeller unit. For example, a screen or other filter media may cover the clean air exhaust port. The filter may be removably secured to the debris canister, for example with a clamping arrangement such as a clamp ring.

A hose storage module may be attached to the collector module. The vacuum hose may be stored inside the hose storage module. A lid may be configured to be opened to allow access to the vacuum hose stored inside the hose compartment, and configured to be closed to cover the vacuum hose stored inside hose compartment.

According to some aspects of the present disclosure, a vehicle may include installed therein any one or more of the vacuum cleaners and any one or more of the components disclosed herein. The vehicle may be a car, a truck, an SUV, an airplane, a boat, a tractor, and so on. The vacuum cleaner may be installed completely or partially within the passenger compartment of the vehicle. Preferably the vacuum cleaner is installed so that a vacuum hose of the vacuum cleaner is disposed on the interior of the passenger compartment. The vacuum cleaner may be installed in a center console in the passenger compartment. The vacuum cleaner may be installed in other locations in the passenger compartment. One or both of the motor housing and the collector housing may be fixedly attached to the vehicle. The debris canister may be configured to be slidably removed from and/or slidably reinserted into the collector housing without disconnecting the collector housing or the motor housing from the vehicle.

The vacuum module may be disposed forward of the collector module with respect to the automobile. The axis of the vacuum module may be disposed transverse, such as perpendicular, to the longitudinal axis of the automobile. For example, the axis of the impeller assembly of the motor/impeller unit may be disposed transverse to the longitudinal axis of the automobile. The vacuum cleaner may be accessible through an accessible opening of the console. The debris canister may slide out of the collector housing and the accessible opening of the console.

The console may include a tray disposed in the accessible opening of the console. The tray may cover the vacuum cleaner. The tray may be configured to be removed from the top opening to provide access to the vacuum cleaner for removal of the debris canister.

The console may include a storage compartment disposed immediately adjacent to the vacuum cleaner. The hose connector may extend from the collector module into the storage compartment. A vacuum hose may be connected to the hose connector and stored inside the storage compartment.

A door panel may be provided that removably covers an opening into the storage compartment. The opening may face the rear of the automobile. The door panel may be configured to be secured and locked to the store compartment in a closed position covering the opening. The door panel may be configured to be unlocked and removed from the storage compartment to provide access to the opening.

A toolholder may be disposed inside the storage compartment. The toolholder may be configured to hold one or more tools in a predefined location inside the store compartment.

In addition, according to another aspect, the collector housing may include a slanted undercut disposed in a peripheral side wall and a key-slot formed in the slanted undercut. The key-slot may have a receiving aperture to receive a hose fitting, and an attachment portion into the which the hose fitting slides to enable the hose fitting to be attached to the collector housing.

According to other aspects, the console may include a first portion adapted to face a front area of the automobile, a second portion adapted to face a rear area of the automobile and having an exhaust opening adjacent to a hose connector, and an underside having a cooling opening that receives cooling air. The exhaust opening may receive exhaust air from the vacuum module.

Further, an underside of the vacuum module may include a cooling recess formed over a portion of the motor enclosed within the vacuum module. The cooling recess may receive cooling air from a cooling air source and working vacuum air through a hose connector. So configured, the cooling air source may be separate from a working vacuum air source, and the cooling air and working vacuum air may combine within the cooling recess.

Still further, the vacuum module may include an underside having at least one vent and a duct. The duct may extend to an underside of the collector module and into an exhaust opening adjacent to a hose connector, such that exhaust air exiting the at least one vent is directed into the duct and through the exhaust opening. The duct may be separate from the cooling recess. In addition, a flow path of exhaust air from the vacuum module and into an exhaust opening adjacent to a hose connector may be separate from a flow path of cooling air.

Additional optional aspects, arrangements, forms, and/or advantages of the vacuum cleaners disclosed herein will be apparent upon consideration of the following detailed description and the appended drawings, each different functionally operable and technically effective combination of which is expressly included as a part of the present disclosure.

BRIEF DESCRIPTION OF THE DRAWINGS

FIG. 1 is an isometric view of a vacuum cleaner to be mounted inside a vehicle according to the present disclosure in a first assembly arrangement and installation orientation;

FIG. 2 is another isometric view of the vacuum cleaner of FIG. 1 in another installation orientation;

FIG. 4 is an isometric view of the vacuum cleaner of FIG. 1 in a second assembly arrangement and installation orientation;

FIG. 5 is another isometric view of the vacuum cleaner of FIG. 1 in the second assembly arrangement in another installation orientation;

DETAILED DESCRIPTION

Turning now to the drawings, FIGS. 1-5 illustrate an in-vehicle vacuum cleaner 50 according to some aspects of the disclosure. The vacuum cleaner 50 is configured to be installed and operated within a vehicle, such as a car or truck or other type of vehicle. Preferably, the vacuum cleaner 50 is configured to be installed within a passenger compartment of the vehicle to provide easy access and use of the vacuum cleaner for cleaning the interior of the passenger compartment.

Figure 3:
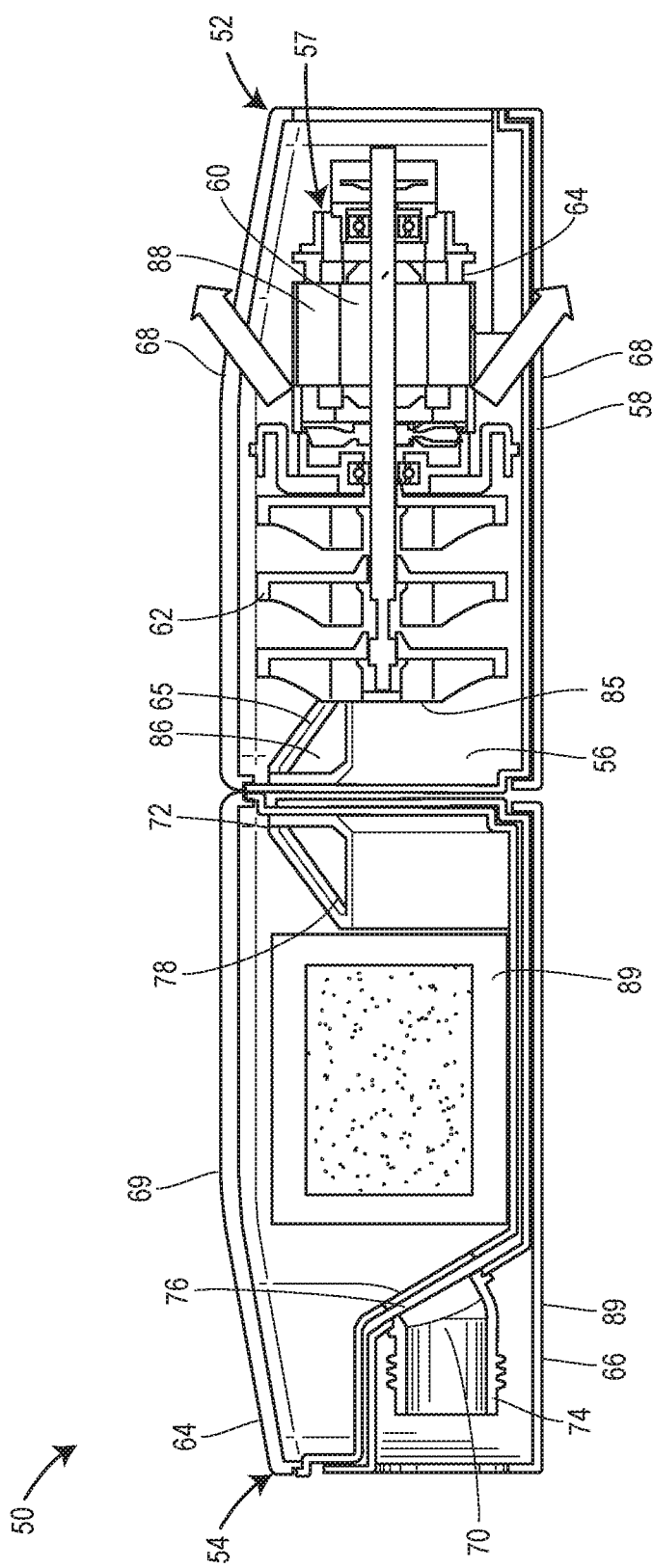
FIG. 3 is a longitudinal cross-sectional view along the lines 3-3 of FIG. 1.
Figure 6:
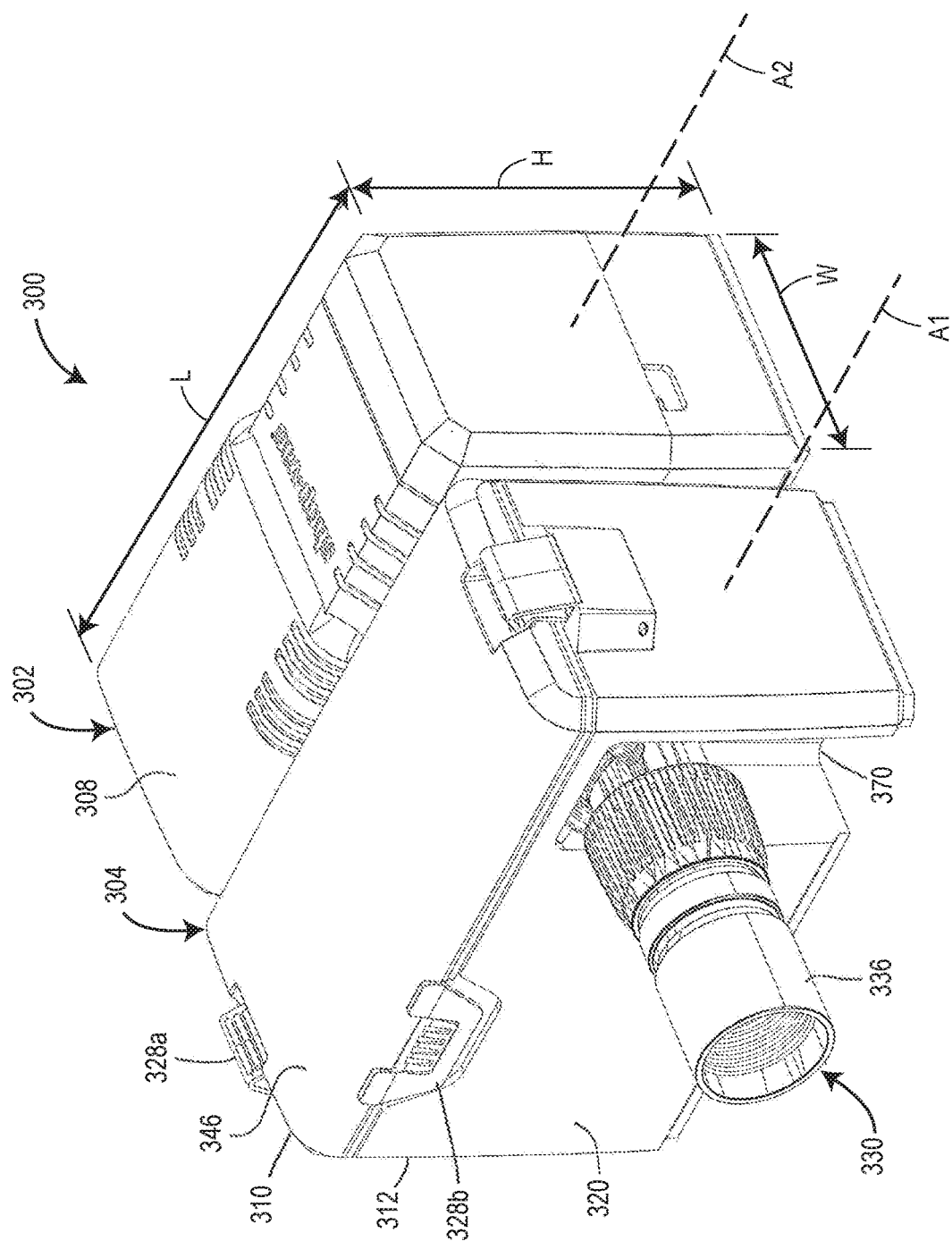
FIG. 6 is a top isometric view of yet another vacuum cleaner to be mounted inside a vehicle according to aspects of the present disclosure.
Figure 7:
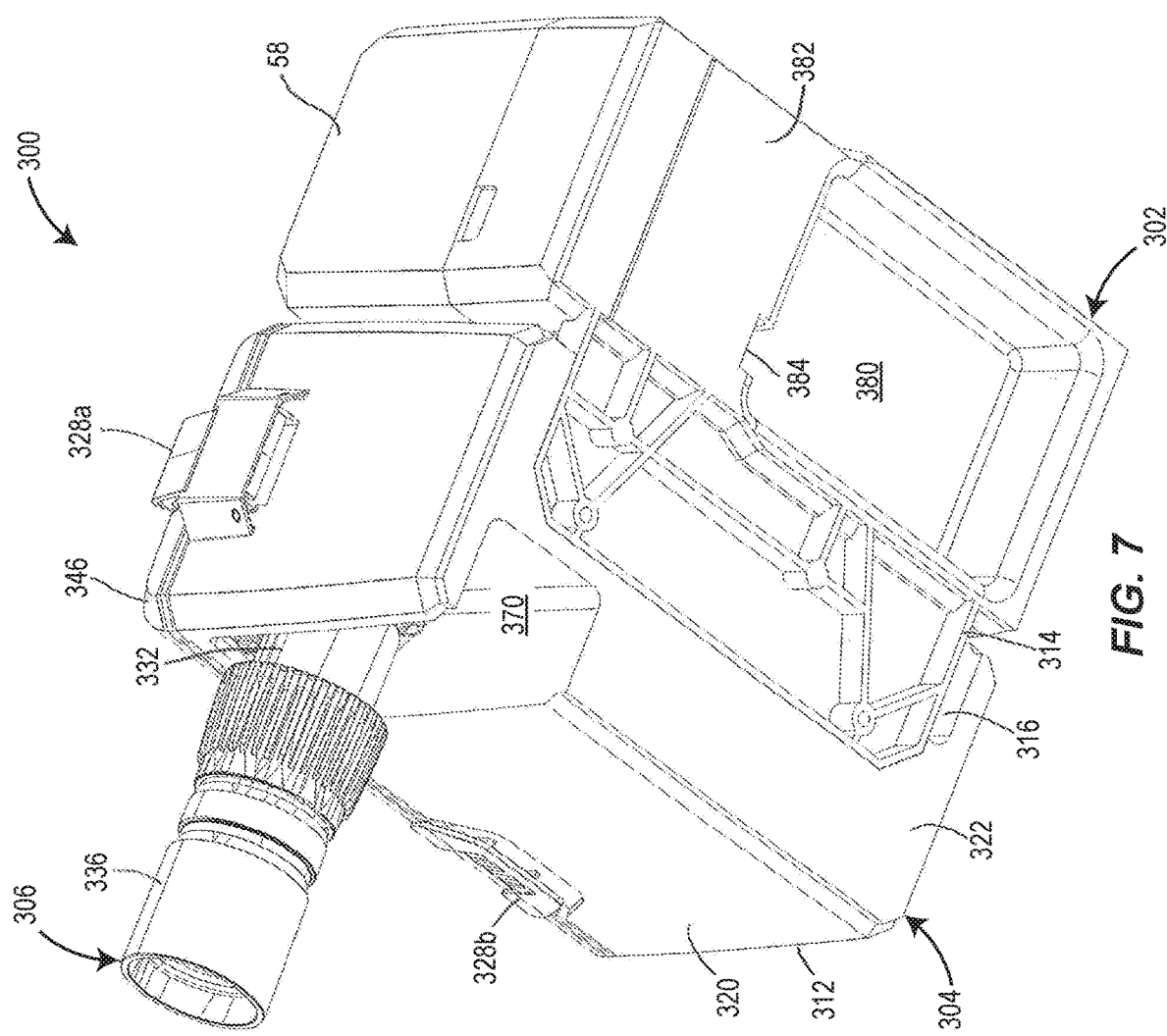
FIG. 7 is a bottom isometric view of the vacuum cleaner of FIG. 6.

The vacuum cleaner 50 has a modular configuration, including a vacuum module 52 and a collector module 54 that can be connected to each other as an integrated unit in any of a plurality of different assembly arrangements with an interconnecting duct 56. The interconnecting duct 56 may be flexible, but can also have a fixed pre-defined shape that allows the collector module 54 to be operatively connected to the vacuum module 52 in only a limited number of predefined assembly arrangements. For example, FIGS. 1-3 illustrate the vacuum cleaner 50 with the collector module 54 operatively connected to the vacuum module 52 in an in-line configuration, and FIGS. 4 and 5 illustrate the vacuum cleaner 50 with the collector module 54 operatively connected to the vacuum module 52 in a side-by-side configuration. Furthermore, FIG. 1 illustrates the vacuum cleaner in the in-line configuration disposed in an upright installation orientation, whereas FIG. 2 illustrates the vacuum cleaner in the in-line configuration disposed in a sideways installation orientation. Similarly, FIG. 4 illustrates the vacuum cleaner in the side-by-side or horizontal configuration disposed in an upright installation orientation, whereas FIG. 5 illustrates the vacuum cleaner in the side-by-side configuration in a sideways or vertical installation orientation.

Because of its modular design, the vacuum cleaner 50 can be easily assembled and/or oriented in many different shapes and orientations, which provides the advantage of being able to easily configure the vacuum cleaner 50 to fit different shapes and/or configurations of spaces within a vehicle while maintaining the vacuum cleaner 50 as an integrated unit. For example, the vacuum cleaner 50 may be configured and oriented to fit in a space between seats, such as within a center console, or the vacuum cleaner 50 may be configured and oriented to fit on the side or underneath a seat, in a space along the side wall of a cargo bay or passenger compartment of a sport utility vehicle (SUV), in the trunk, and so on. However, because the interconnecting duct 56 can have a substantially rigid shape and couples the collector module 54 to the vacuum module 52 in orientations as an integral unit, the vacuum cleaner 50 can be easily installed and/or removed and/or otherwise moved around as a single unit, which may provide easier handling of the vacuum cleaner 50 as compared to a vacuum cleaner that is not connected together as an integrated unit.

FIG. 3 illustrates in greater detail various components of the vacuum cleaner 50 in the assembled configuration corresponding with FIGS. 1 and 2. However, the same components are also provided in the assembled configuration of FIGS. 4 and 5.

The vacuum module 52 includes a motor/impeller unit 57 bundled together as a single component within a motor housing 58. The motor housing 58 in this arrangement is in the form of an outer shell having a generally elongate rectangular form. However, the motor housing 58 may take many different forms, shapes and sizes depending upon the particular space needs and/or arrangements desired for installation in a particular vehicle. The motor/impeller unit 57 includes a motor 60 that drives an impeller assembly 62 and a controller 64 that controls the motor 60. The motor 60 can be of any design suitable for vacuum cleaners, including standard motors with brushes or brushless motors, including switched reluctance motors. The impeller assembly 62 may take any form suitable for moving air in a manner that will create a vacuum. In this arrangement, the impeller assembly 62 includes three in-line impellers. However, other forms of the impeller assembly 62 may also be used. The motor 60 is operatively coupled to the impeller assembly 62 in order to drive the impellers to create a vacuum. The controller 64 includes suitable electronics, such as a PCB board and/or other appropriate electronic control circuits configured to control the motor 60. As most easily seen in FIG. 3, the motor housing 58 includes an intake opening 65 that forms a duct receiver and an air inlet for air that is drawn into the impeller assembly 62 and one or more air outlet openings 68 for exhausting air exhausted from the impeller assembly 62.

The collector module 54 includes a debris canister 64 disposed within a collector housing 66. The debris canister 64 includes a lid 69 that can be selectively opened to provide access to the interior of the debris canister 64. The debris canister 64 is removably received within the collector housing 66 such that the debris canister 64 can be slidably removed from and returned into the collector housing 66. The collector housing 66 also includes an air inlet 70 at one end of the housing and an air exhaust opening 72 is the opposite end of the collector housing 66. A hose connector 74 extends outwardly from the air inlet 70 for coupling with a vacuum hose (not shown). The air exhaust opening 72 also informs a duct receiver and an air outlet. The debris canister 64 also includes an air intake opening 76 and an air outlet opening 78. The air intake opening 76 and the air outlet opening 78 of the debris canister 64 align with the air inlet 70 and the air exhaust opening 72 of the collector housing 66, respectively, when the debris canister 64 is operatively disposed within the collector housing 66, as shown in FIG. 3.

As best seen in FIG. 3, the interconnecting duct 56 has a substantially rigid body 80 that forms a duct 82 extending from a first duct opening 84 to a second duct opening 86. As will become apparent from the remainder of the description, the interconnecting duct 56 may have different shapes and sizes depending upon the particular arrangements desired for the vacuum cleaner 50. As can be seen from FIGS. 1, 2, 4, 5, the interconnecting duct 56 has a shape and form such that the vacuum module 52 can be operatively connected to the collector module 54 in at least two, and possibly more, different assembly arrangements.

Turning now to FIGS. 6-12, another example vacuum cleaner 300 of the present disclosure is illustrated having yet a further form factor and assembly arrangement. The vacuum cleaner 300 is similar to the vacuum cleaner 50 and also includes features of the vacuum cleaners 50, as described in further detail hereinafter. The vacuum cleaner 300 is configured to be operatively mounted in a vehicle, such as a car, truck, SUV, or other automobile. However, the vacuum cleaner 300 could be operatively mounted in other types of vehicles and/or in other arrangements within vehicles.

The vacuum cleaner 300 includes a vacuum module 302 and a collector module 304 operatively connected with each other by an interconnecting duct 306. In general, the vacuum module 302 is substantially similar functionally to the vacuum modules and 52, 100, and 152, including the motor/impeller unit 57 disposed within the motor housing 308, but with a slightly different form factor than the motor housing 58 to conform to a specific vehicle interior. Similarly, the collector module 304 includes a debris canister 310 removably received within a collector housing 312, but also with a slightly different form factor to conform to the specific vehicle interior. In particular, the vacuum module 302 is configured to generate a vacuum by means of operation of the motor/impeller unit 57 to draw air into the motor/impeller unit. The interconnecting duct 306 extends from the vacuum module 302 to the collector module 304 and is operatively arranged such that air drawn by the motor/impeller unit 57 is drawn through the interior of the collector module 304. The collector module 304 is configured to collect debris, such as dirt and other particles, from air drawn by the vacuum module 302. For example, a filter bag (not shown) may be operatively installed inside the collector module 304. When the motor/impeller unit 57 is turned on, the vacuum module 302 sucks air in through the collector module 304, and debris drawn with the air can be collected inside the collector module 304, for example inside the filter bag.

The collector module 304 is arranged in a side-by-side position immediately adjacent the vacuum module 302. As most easily seen in FIGS. 6-8, each of the collector module 304 and the vacuum module 302 has the general shape of an elongate rectangular box having a top side, a bottom side, and two opposite side walls extending between two opposite end walls. The collector module 304 has approximately the same exterior size and shape as the vacuum module 302, although not exactly the same. In particular, each of the collector housing 312 and the motor housing 308 has a height H extending from a bottom wall to a top wall, a width W extending from a first sidewall to a second side wall, and a length L extending from a first end wall to a second end wall. The length L is significantly longer than either the height H or the width W, thereby defining an axis A along the length L dimension. The height H is slightly larger than the width W. In the side-by-side arrangement, the axis A1 of the collector module 304 is parallel to the axis A2 of the vacuum module 302, the end walls of the vacuum module 302 and the collector module 304 are aligned with each other, and the bottom walls and the top walls are also aligned with each other, thereby forming an overall generally rectangular shape. In the present arrangement, each of the motor housing 308 and the collector housing 212 has its own sidewall, and the adjacent sidewalls may be touching each other or slightly spaced apart from each other. In other arrangements however, the collector module 304 and the vacuum module 302 could share a single unified sidewall.

A bracket 314 (see FIGS. 7, 10, and 11) serves as stand or pedestal for and connects the collector module 304 to the vacuum module 302. The bracket 314 attaches the collector housing 312 to the motor housing 308 and attaches both to the base of the vehicle. The bracket 314 extends laterally from the bottom end of the side wall of the motor housing 308 aligned generally parallel with the bottom wall 382 of the motor housing. The bottom wall 322 of the collector housing 312 defines a recessed cavity 316 that receives the bracket 314. Preferably, the recessed cavity 316 has a shape that corresponds to the shape of the bracket 314 so that the bracket 314 fits snugly within the recessed cavity 316. The bracket may be secured to the bottom wall 322 of the collector housing 312 in the recessed cavity 316, for example with fasteners and/or adhesive and/or snap fit connectors. When thus operatively coupled together, the bottom wall of the collector housing 312 is aligned approximately parallel with the bottom wall of the motor housing 308. However, the bracket 314 may take any of many other forms suitable for attaching the collector housing 312 to the motor housing 308.

Figure 8:
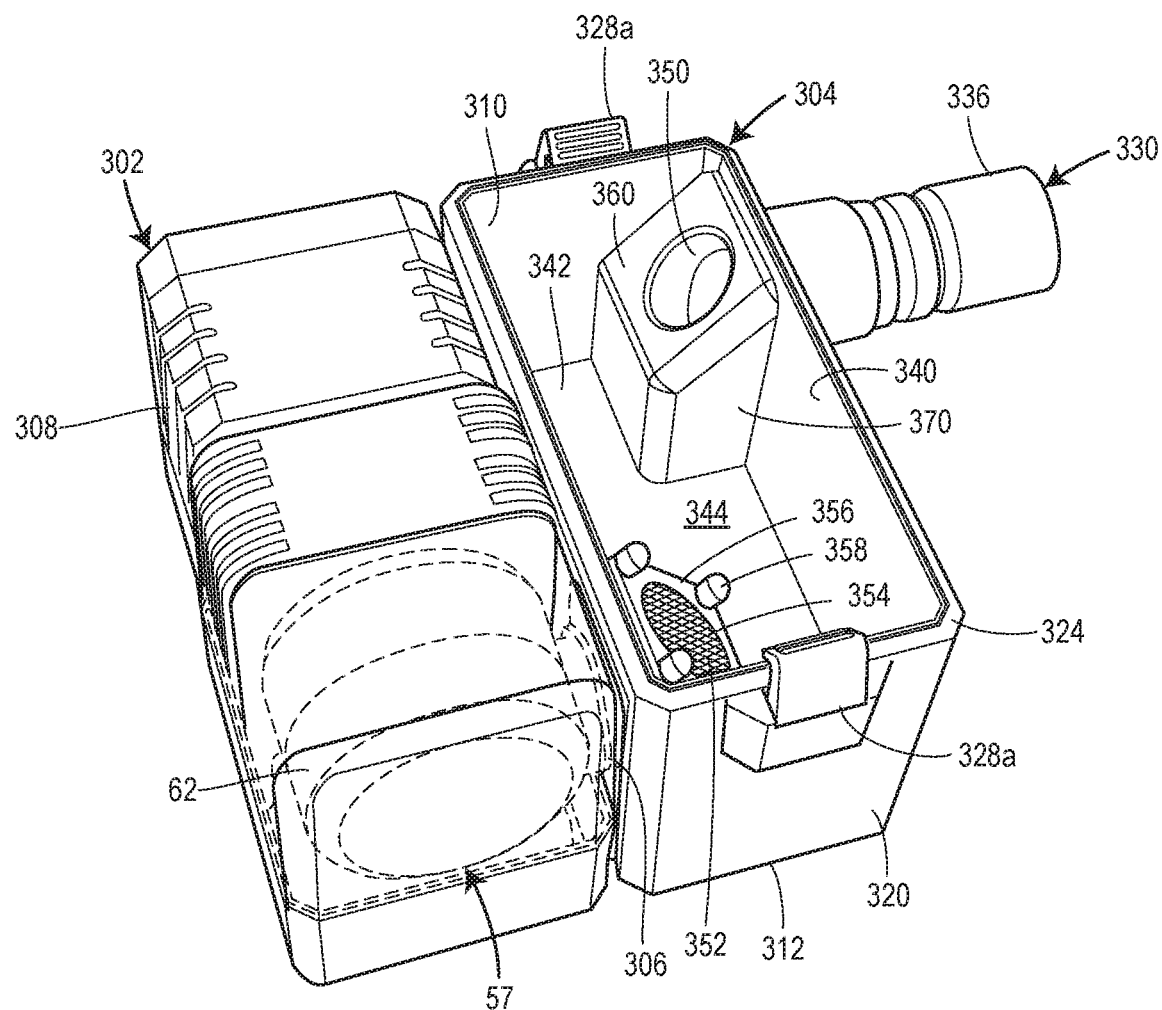
FIG. 8 is another top isometric view of the vacuum cleaner FIG. 6 with top covers removed to show interior portions of the vacuum cleaner.
Figure 9:
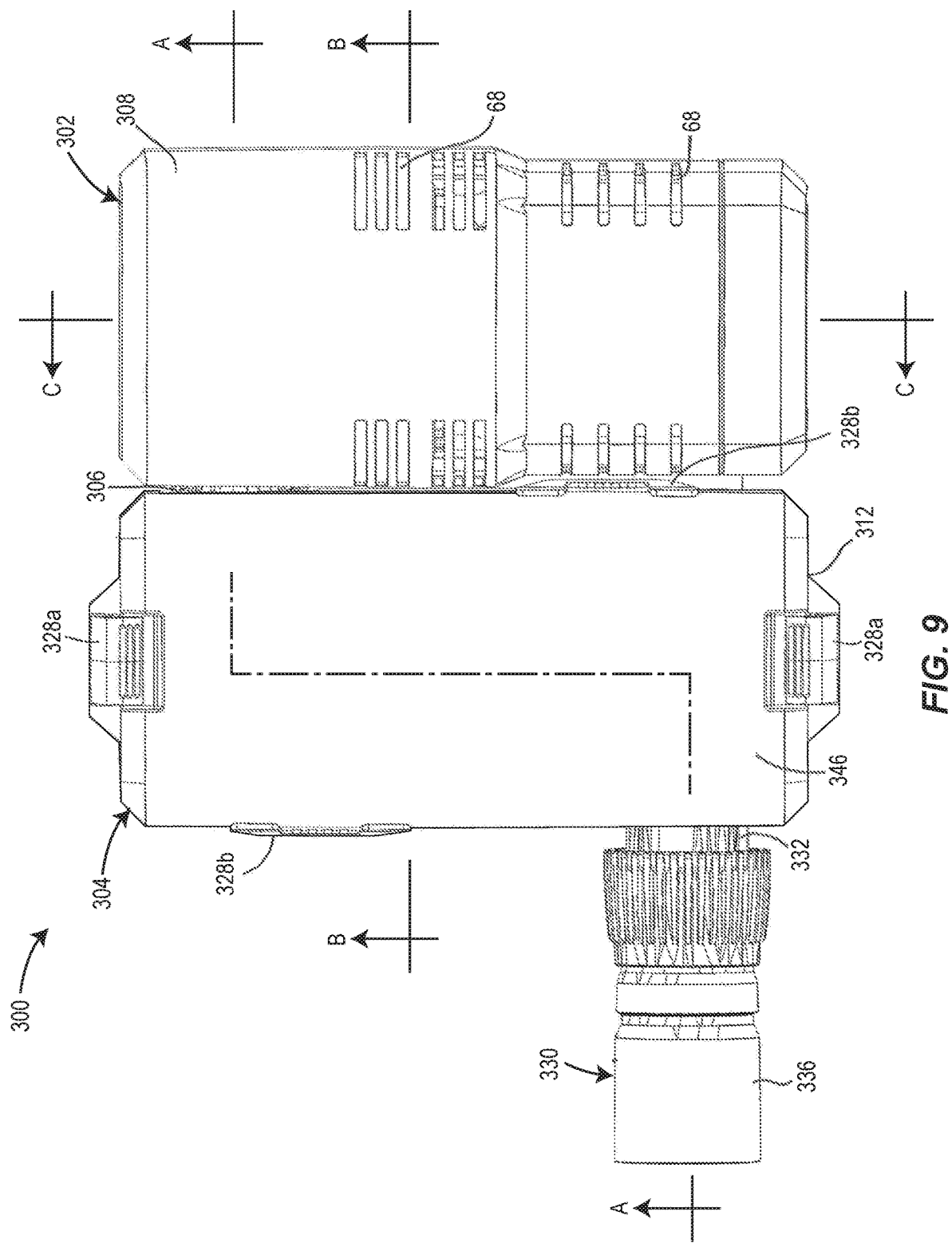
FIG. 9 is a top plan view of the vacuum cleaner FIG. 6 with the top covers in place.
Figure 10:
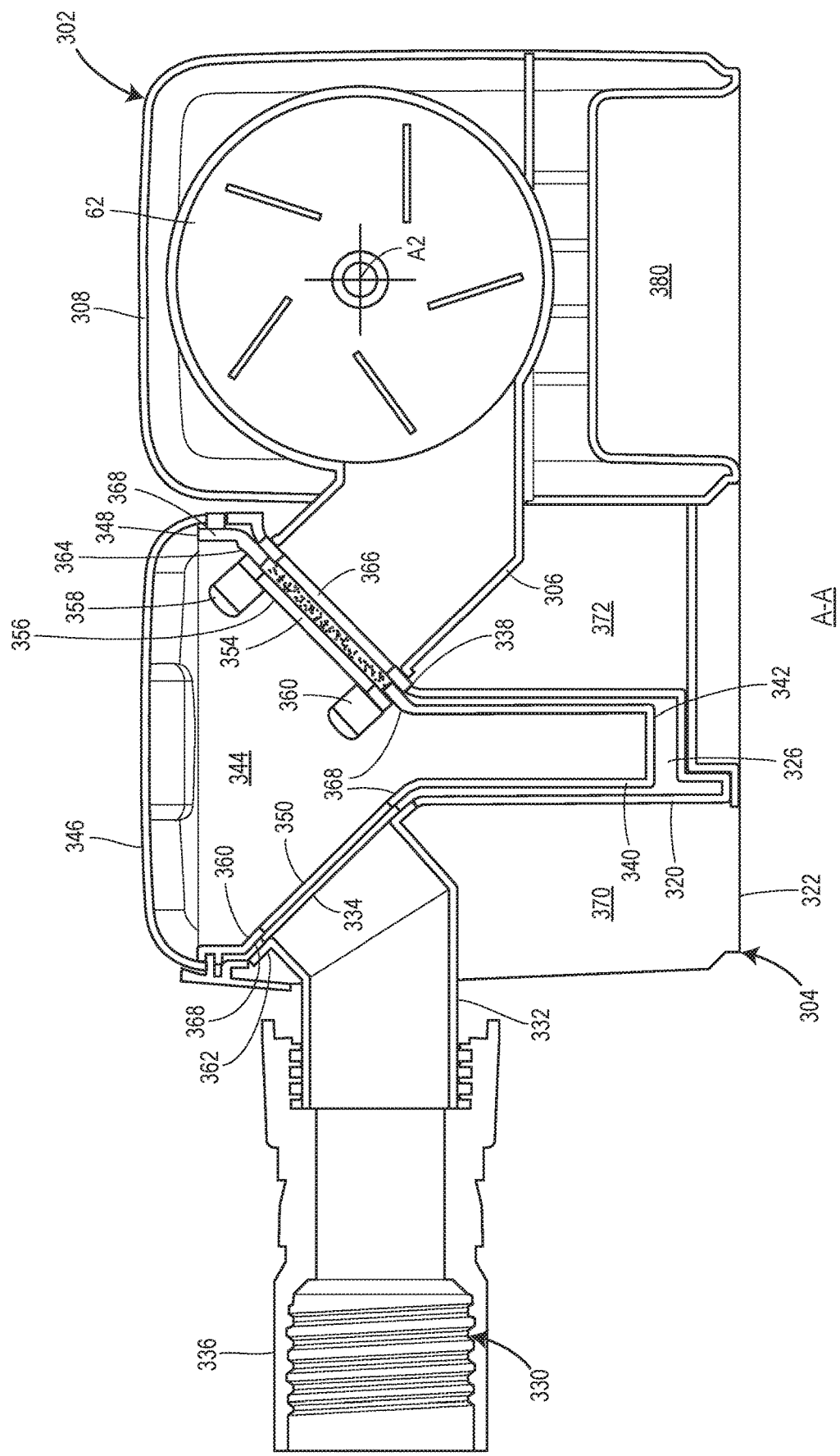
FIG. 10 is a cross section along the lines A-A in FIG. 9.
Figure 11:
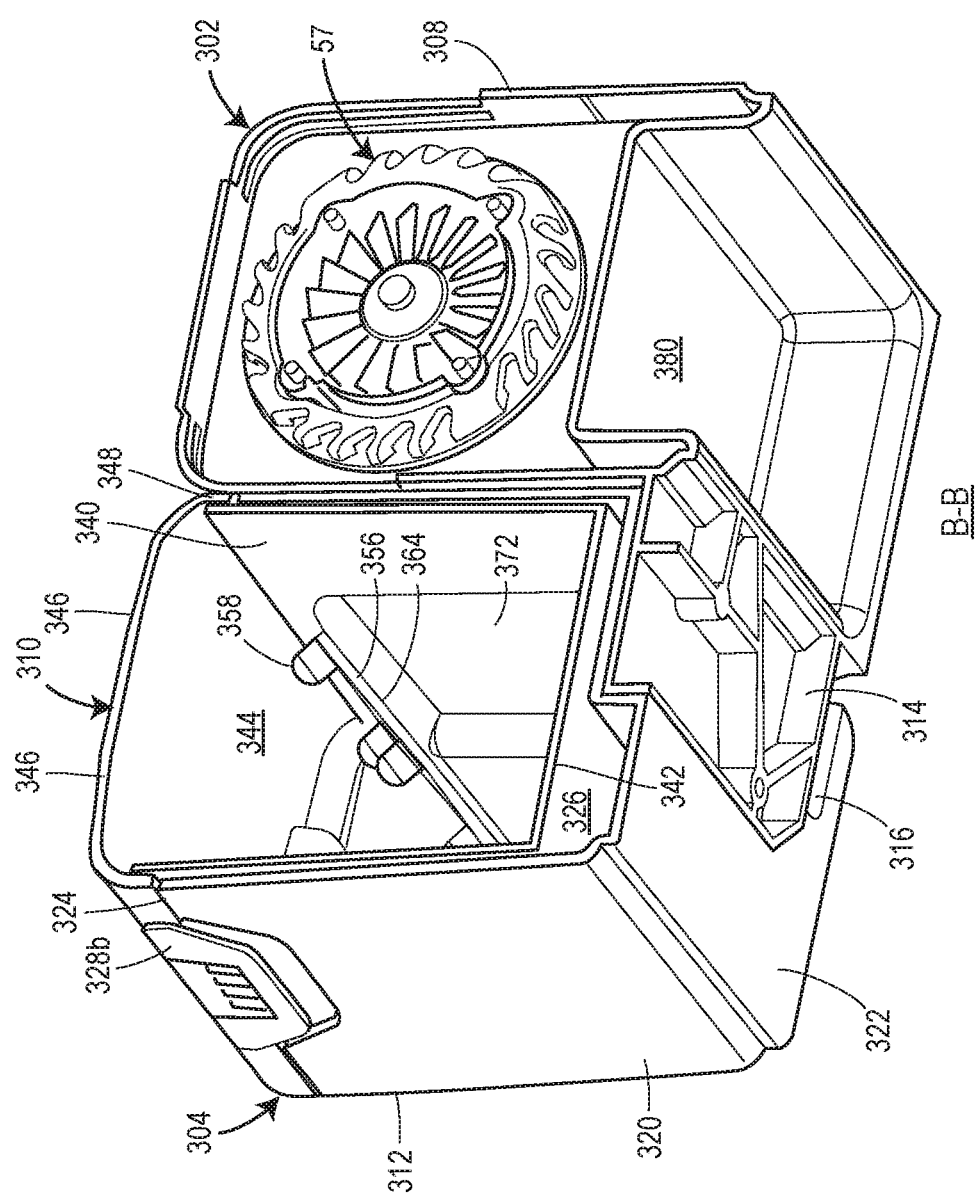
FIG. 11 is an isometric cross-sectional view along the lines B-B in FIG. 9.

As best seen in FIGS. 8, 10, and 11, the collector housing 312 has a peripheral sidewall 320 extending upwardly from the outer circumferential edge of a bottom wall 322. The peripheral sidewall 320 defines the two sidewalls and the two end walls described previously. However, the peripheral sidewall 320 may include additional wall portions and is not limited to a four-sided shape. A top edge of the peripheral sidewall 320 defines an accessible portion, such as a top opening 324 opposite the bottom wall 322 that opens into an interior space 326. The debris canister 310 slides into an operative position in the interior space 326 of the collector housing 312 through the top opening 324. The debris canister 310 can also be slide out of the collector housing 312 straight up through the accessible portion, such as the top opening 324.

One or more latches 328 releasably lock the debris canister 310 in the operative position disposed in the interior space 326 of the collector housing 312 as shown in the drawings. In this example, four latches 328 are provided, one set of latches 328a on each of the opposite end walls of the collector housing 312, and one set of latches 328b on each of the side walls. The latches 328 may take any of various forms. In this example, the latches 328a on the opposite end walls are in the form of hinged hook members that hook into a recess in the top of the debris canister 310. The latches 328b on the side wall are in the form of a resilient bracket at the top of the debris canister 310 that slidably slides and snaps over a corresponding projection in the sidewall of the collector housing 312. However, the latches 328 may take other forms suitable for releasably locking the debris canister into the operative position in the interior space 326 of the collector housing 312. The latches 328a secure the canister 310, including its lid 346, to the collector housing 312. When the canister 310 has been removed from the collector housing 312, the latches 312b are opened so the that lid 346 can be opened for removal of debris or cleaning of the canister 310.

A hose connector 330 projects laterally from the peripheral sidewall 320 of the collector housing 312. The hose connector 330 is disposed on the opposite side wall away from the vacuum module 302, and projects away from the vacuum module 302. The hose connector 330 is aligned transverse, and preferably perpendicular, to the axis A1 of the collector module 304. In this way, when the hose connector 330 points toward the rear of the vehicle, the axes A1 and A2 are aligned transverse to the length of the vehicle, as described in further detail below. As best seen in FIG. 10, the hose connector 330 includes a hollow tube 332 extending from an air intake opening 334 through the peripheral side wall 320. The hollow tube 332 may be integral with the peripheral side wall 320 or separable from the peripheral side wall 320. A hose coupling 336 is disposed on a distal end of the hollow tube 332. The hose coupling 336 in this arrangement includes a collar that is rotatably carried on the end of the hollow tube 332 and includes internal threads configured to couple to a correspondingly threaded end of a vacuum hose (not shown) or other vacuum accessory. Seals may be provided between the hose coupling 336 and the hollow tube 332 to further improve efficiency of the vacuum cleaner. However, the hose connector 330 does not necessarily include the hose coupling 336, and/or the hose coupling 336 may take other forms.

The interconnecting duct 306 projects laterally from the peripheral sidewall 320 of the collector housing 312 and fluidly connects the collector housing 312 with the motor/impeller unit 57. As best seen in FIG. 10, the interconnecting duct 306 is disposed on the sidewall immediately adjacent the vacuum module 302, and projects toward the vacuum module 302. Thus, the interconnecting duct 306 is on the opposite side wall from the hose connector 330. The interconnecting duct 306 is also formed by a hollow tube that extends from an air outlet opening 338 through the peripheral sidewall 320 of the collector housing 312 to an air inlet for the motor/impeller unit 57. In this arrangement, the interconnecting duct 338 is attached to and/or carried by the motor/impeller unit 57 and sealingly fits up against the exterior side of the peripheral sidewall 320 surrounding the air outlet opening 338. However, in other arrangements, the interconnecting duct 338 or a portion thereof could be attached to the peripheral sidewall 320 and operatively connect with the motor/impeller unit 57. In this way, when the collector housing 312 is operatively attached to the motor housing 308, as shown in the drawings, a vacuum drawn by the motor/impeller unit 57 pulls air from the collector module 304 through the interconnecting duct 306. Similar to the hose connector 330, the interconnecting duct 306 is also aligned transverse to the axes A1 and A2. Further, as best seen in FIG. 8, the hose connector 330 and the interconnecting duct 306 are offset from each other along the axes A1 at the opposite ends of the collector housing 312.

The debris canister 310, as best seen in FIGS. 8, 10, and 11, also has a box like shape that fits down into the interior space 326 of the collector housing 312. In particular, the debris canister 310 includes a peripheral sidewall 340 extending upwardly from an outer peripheral edge of a bottom wall 342 defining an interior space 344. An upper edge of the peripheral sidewall 340 defines an opening into the interior space 344. A lid 346 covers the opening into the interior space 344.

The debris canister 310 includes a dirty air intake port 350 and a clean air exhaust port 352, each extending through opposite side sections of the peripheral sidewall 340. When the debris canister 310 is operatively inserted into the interior space 326 of the collector housing 312, the dirty air intake port 350 aligns with the air intake opening 334 of the collector housing 312, and the clean air exhaust port 352 aligns with the air outlet opening 338 of the collector housing 312. In this way, when the debris canister is disposed inside the collector housing 312, vacuum from the motor/impeller unit 57 is fluidly connected to the hose connector 330 such that air and debris is drawn into the debris canister 312 from the hose connector 330. In other words, a stream of air is drawn in through the hose connector 330, passes through the debris canister from the dirty air intake port 350 to the dirty air outlet port 352, and then is drawn through the interconnecting duct 306 into the impeller assembly 62. Preferably, a filter bag is operatively disposed in interior space 344 so as to filter out debris from the air drawn through the debris canister 312.

A filter 354, such as a screen or other filter media, covers the clean air exhaust port 352 to remove particulate matter that may be drawn through the filter bag. A cylindrical and/or pleated type filter may be located in the canister and connected to the exhaust port 352 to provide an extra level of filtering before the air exits the canister. In this way, the air that is pulled into the motor/impeller unit 57 through the interconnecting duct 306 will be substantially free of dirt and debris, which could otherwise damage the impellers or other portions of the motor/impeller unit 57. The filter 354 is preferably removable to allow for easy cleaning. A clamp collar 356 around the outer periphery of the clean air exhaust port 352 to releasably clamps the filter 354 over the clean air exhaust port 352. The clamp collar 356 is releasably clamped onto the interior surface of the peripheral sidewall 340 with clamp screws 358. However, other arrangements for securing the filter 354 are possible. In addition, the filter 354 may be permanently secured across the clean air exhaust port 352 or the filter 354 may be omitted entirely.

As best seen in FIGS. 8 and 10, the interface between the exterior side of the peripheral sidewall 340 and the interior side of the peripheral sidewall 320 surrounding the air intake opening 334 and the air outlet opening 338 is slanted at an angle inwardly and downwardly. Thus, the dirty air intake port 350 extends through a first slanted overhang section 360 of the peripheral sidewall 340, and the air intake opening 334 extends through a first slanted shoulder portion 362 of the peripheral sidewall 320. The first slanted overhang section 360 of the debris canister peripheral sidewall 340 mates with the first slanted shoulder portion 362 of the collector housing peripheral sidewall 320. Preferably, this interface is slanted at an angle of between approximately 20° and 80° from the direction of motion for removing and inserting the debris canister 310 into the collector housing 312 (which in the drawings, is a vertical direction extending upwardly from the bottom walls 332 and 342) so that the first slanted overhang section 360 rests on top of the first slanted shoulder portion 362. Similarly, the clean air exhaust port 352 extends through a second slanted overhang section 364 of the peripheral sidewall 340, and the air outlet opening 338 extends through a second slanted shoulder portion 366 of the peripheral sidewall 320. The second slanted overhang section 364 of the debris canister sidewall mates with the second slanted shoulder portion 366 of the collector housing sidewall. Preferably, this interface is also slanted at an angle of between approximately 20° and 80° from the from the direction of sliding the debris canister 310 into and out of the collector housing 312 so that the second slanted overhang section rests on top of the second slanted shoulder portion. A seal 368, such as a compression gasket, is disposed at the interface between the slanted overhangs and the slanted shoulders around each of the air intake opening 334 and the air outlet opening 338. The seals 368 preferably form an airtight seal around each of the openings between the respective slanted overhang sections and slanted shoulder portions. It has been found that the slanted interface between the two peripheral sidewall 320 and 340 at these seals 368, i.e., the interface between the slanted overhangs 360 and 364 and the respective slanted shoulders 362 and 366, provides a good balance between forming an airtight seal around the openings 334 and 338 at the fluid interface between the openings and the respective ports 350, 352, ease of removing and reinserting the debris canister 310 from the collector housing 312, and reducing wear of the seals 368 from the removal and reinsertion of the debris canister 310. Preferably, the interface between the slanted shoulders 362 and 366 and the slanted overhangs 360 and 364 is at approximately 45°.

The slanted overhang sections 360 and 364 are configured so that the bottom wall 342 of the debris canister 310 is spaced above and does not rest on the bottom wall 332 of the collector housing 312 when operatively disposed therein. This further helps ensure a good airtight seal around the openings 334, 338 and the respective ports 350, 352, which can improve the efficiency of the vacuum cleaner 300.

A first vertical recess 370 is defined in the exterior side of the peripheral sidewall 340 of the debris canister 310 below the first slanted overhang 360. The first vertical recess 370 extends all the way from the first slanted overhang 360 to and through the level of the bottom wall 342. Similarly, a second vertical recess 372 is defined in the exterior side of the peripheral sidewall 340 below the second slanted overhang 364. The second vertical recess 372 extends all the way from the first slanted overhang 364 to and through the level of the bottom wall 342. In this way, when the deep debris canister 310 is slid in and out of the collector housing 312, the first slanted shoulder 362 can slide in and out of the first vertical recess 370 and the second slanted shoulder can slide in and out of the second vertical recess 372. The vertical recesses 370 and 372 also help ensure a proper alignment of the debris canister 310 inside the collector housing 312 when sliding the debris canister 310 into its operative position inside the collector housing 312.

With the above-described configuration, the debris canister 310 is configured to be easily removed from and reinserted into the interior space 326 of the collector housing 312 through the top opening 324 while also forming a good seal (preferably airtight) debris canister 310 and the collector housing 312 around the openings 334 and 338 and the ports 350 and 352. This arrangement allows the debris canister 310 to be removed from the collector housing 312 with a so-called "straight pull," whereby there is no pivoting of the debris canister 310 relative to the collector housing 312 when removing (and re-inserting) the debris canister 310 relative from the collector housing 312, which can be both more convenient for the user and reduce wear on the seals 468. Substantially similar arrangements of inwardly slanted seal interface surfaces between the debris canister and the collector housing to allow for a "straight pull" may also be implemented in the other exemplary collector module 54 in a similar manner.

Figure 12:
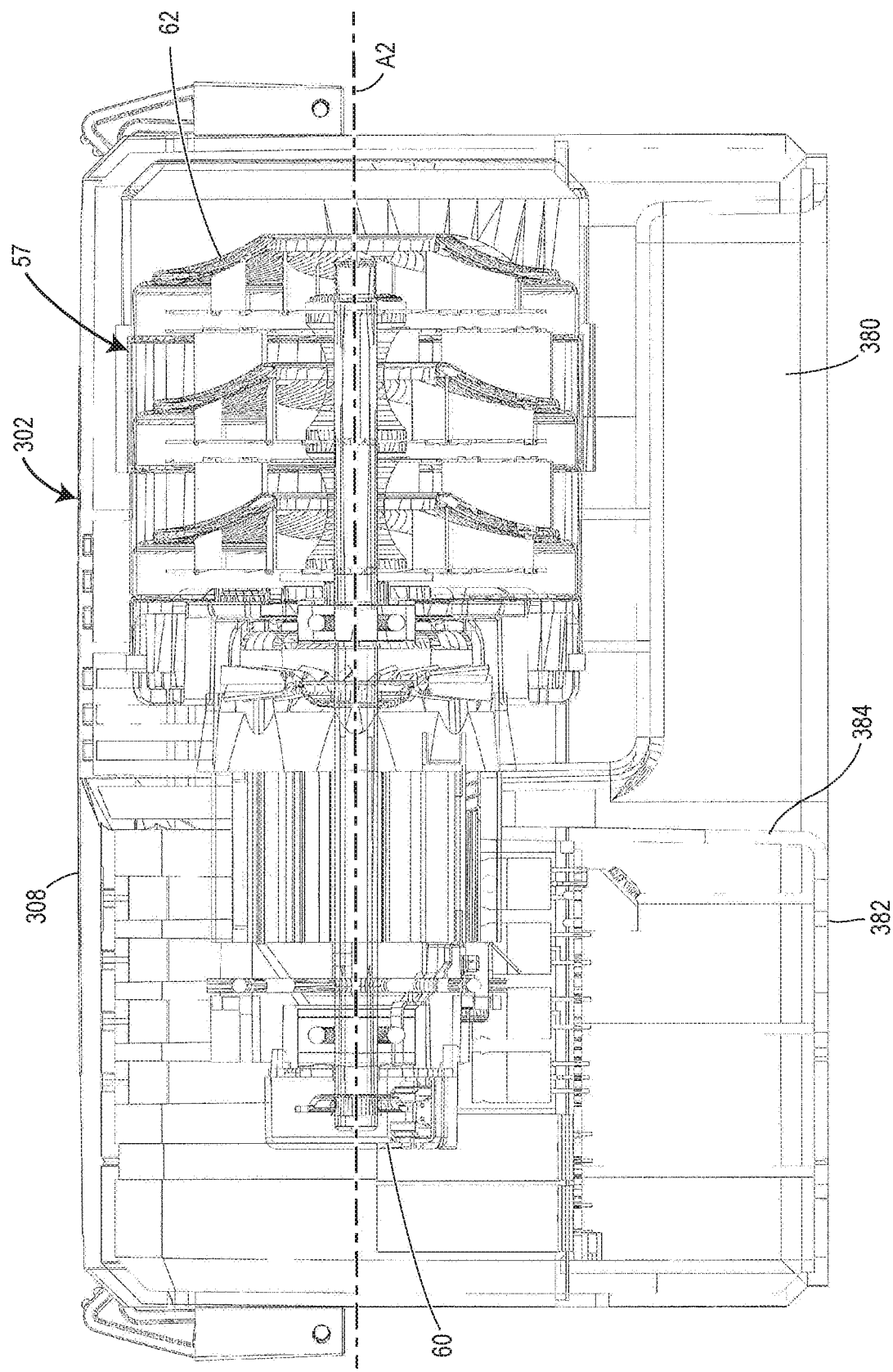
FIG. 12 is a cross-section along the lines C-C in FIG. 9.

FIG. 12 shows a detail axial cross-sectional through the vacuum module 302 along the axis A2. Except as described otherwise, the vacuum module 302 functions and is arranged substantially similarly to the vacuum module 52, the substance of which is not repeated here for the sake of brevity, but is incorporated as equally applicable to the vacuum module 302.

A cavity 380 is defined in the exterior surface of the bottom wall 382 of the motor housing 308. An electrical port 384 extends through the bottom wall into the cavity 380. Preferably, the electrical port 382 is sized to receive one or both portions of an electrical plug, such as the plugs 124*a* and/or 124*b*. For example, the first half of the electrical plug 124a, which is operatively electrically coupled with the motor 60 may be secured in the electrical port 384 such that the second half of the electrical plug 124be can be easily plugged into the electrical plug 124a during installation of the vacuum cleaner 300 into a vehicle. Preferably, the cavity 380 is sized to receive and store portions of the power supply wire harness 122 neatly underneath the vacuum cleaner 300. In this way, it may be easier to install the vacuum cleaner 300 into a vehicle and to maintain the wire harness at the connection to the vacuum cleaner in a neat and orderly arrangement.

Each of the vacuum cleaners disclosed herein may be configured to be installed within a vehicle, such as a car, truck, etc. Preferably, one or both of the motor housing 58 and the collector housing 66 is fixedly attached to the vehicle, such as with fasteners, clips, screws, etc.

Figure 13:
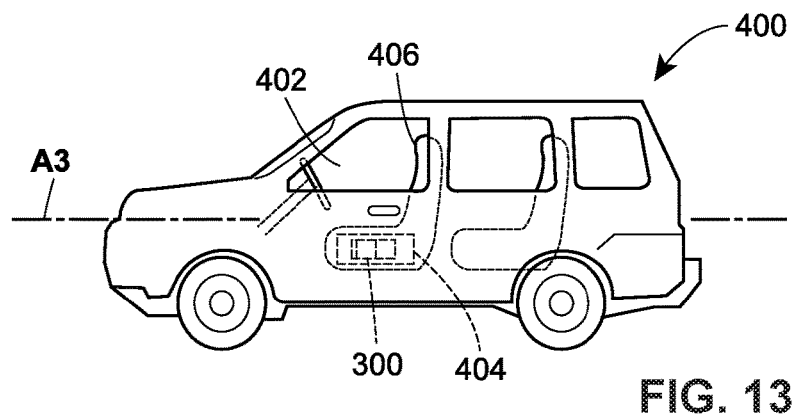
FIG. 13 is an exemplary illustration of the vacuum cleaner of FIG. 6 operatively installed in a vehicle.

Turning now to FIGS. 13-16, the vacuum cleaner 300 is operatively installed in the passenger compartment 402 of an exemplary automobile 400 with the vacuum cleaner 300 being secured to one or more fixtures inside the passenger compartment 402 with appropriate fasteners to prevent it from moving around inside the passenger compartment, and the motor/impeller unit 57 being electrically connected to the electrical system of the automobile 400 so as to provide sufficient power to the motor 62 run the vacuum cleaner 300 for cleaning the interior of the passenger compartment 42. In the example of FIG. 13, the automobile 400 is illustrated as a sport-utility vehicle. However, the automobile 400 could take other forms, such as a car, a truck, a tractor, or any other type of vehicle with a passenger compartment and an electrical system sufficient to power the vacuum cleaner 300, such as an aircraft or boat.

Figure 14:
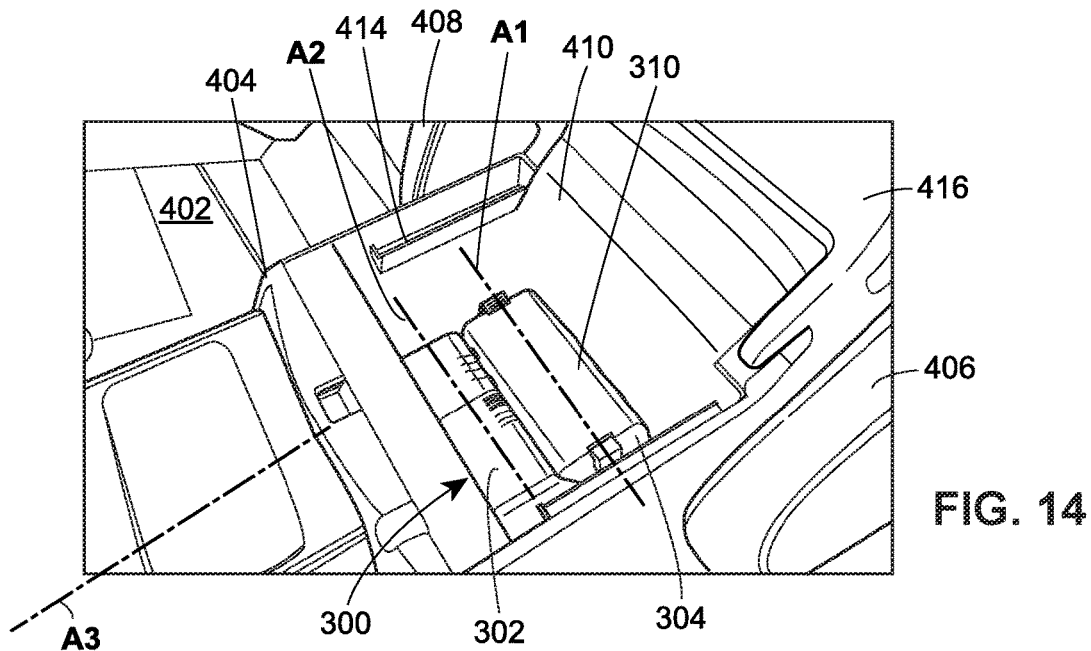
FIG. 14 is an enlarged isometric view of a center console of the vehicle of FIG. 13 with the vacuum cleaner installed and exposed.
Figure 15:
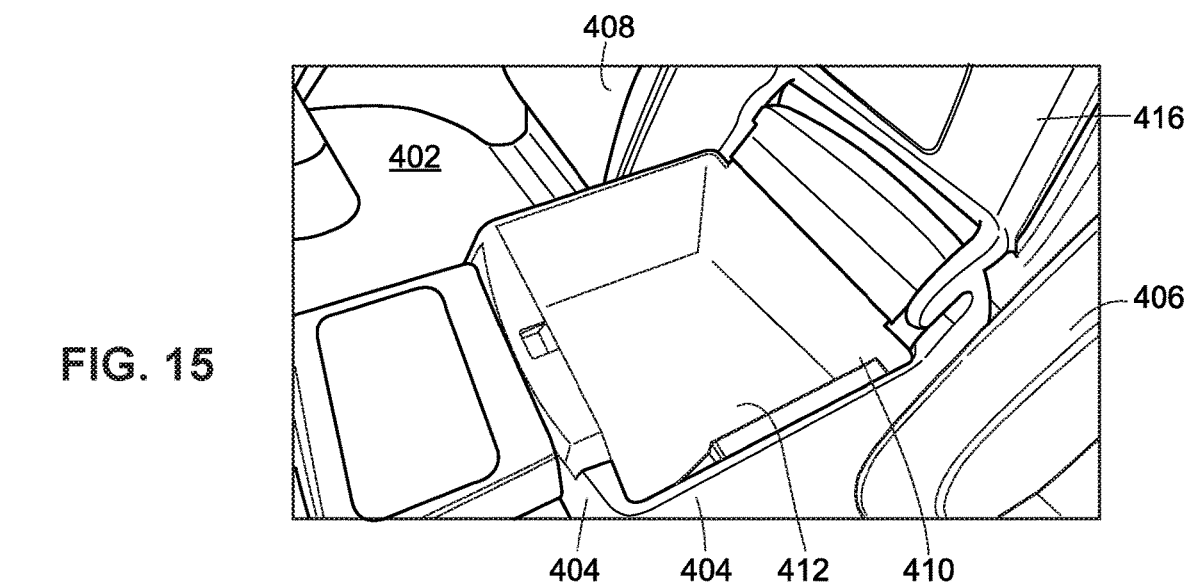
FIG. 15 is an enlarged isometric view of the center console similar to FIG. 14 with a removable tray covering the vacuum cleaner.
Figure 16:
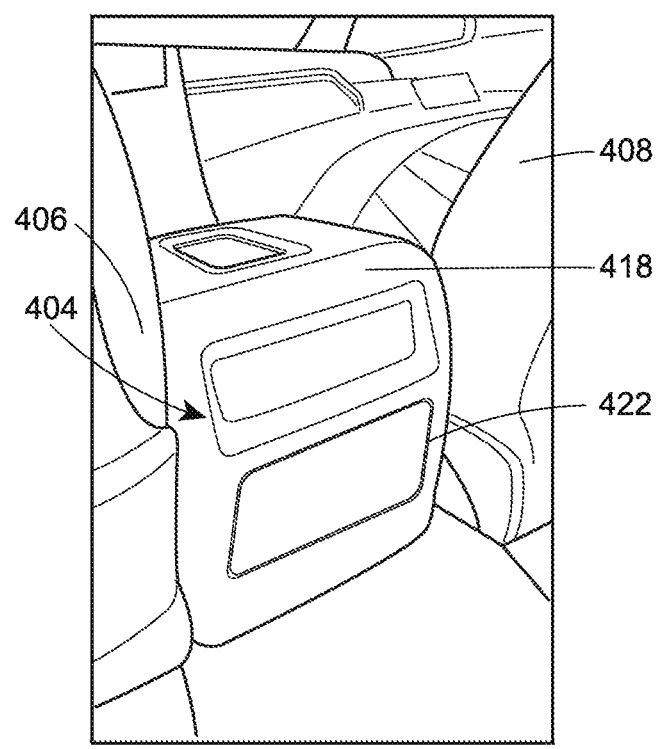
FIG. 16 is an isometric view of a rear side of the center console showing a hose storage compartment with a compartment door closed.

As best seen in FIG. 14, the vacuum cleaner 300 is secured inside a center console 404 located between a driver's seat 406 and a passenger seat 408. In other arrangements, the vacuum cleaner 300 may be secured inside a center console between two other seats in the passenger compartment 402, such as between two passenger seats in an intermediate row of seats of the automobile 400. Preferably, the vacuum cleaner 300 is completely surrounded by the center console 404, such that the center console hides the vacuum cleaner 300 from view of passengers inside the passenger compartment 402. The vacuum cleaner 300 may be secured in any manner sufficient to prevent the collector housing 312 and the motor housing 308 from moving around inside the console. For example, one or both of the collector housing 312 and the motor housing 308 may be secured to portions of the center console 404 and/or other portions of the passenger compartment 402, for example with brackets and/or fasteners. In any event, the vacuum cleaner 300 is operatively installed and secured with the lid 346 of the debris canister 310 facing upwardly directly below an accessible opening, such as a top opening 410, down into the interior of the center console 404. In this way, the debris canister 310 can be removed from the collector housing 312 by pulling the debris canister 310 straight upwardly out of the top opening 324 of the collector housing 312 (as described previously) and further removed from the interior of the center console 404 upwardly through the top opening 410. Similarly, the debris canister 310 can be easily returned to its operative position in the vacuum cleaner 300 by inserting the debris canister 310 down into the interior of the center console 404 through the top opening 410 and straight downwardly into the interior space 326 of the collector housing 312. This allows the debris canister 310 to be easily removed from the automobile 400 for removing accumulated debris, cleaning, or other purposes, and reinstalled into its operative position, without having to disconnect and/or disassemble a vacuum hose or other portion of the vacuum cleaner 300 from the installed operative position.

The vacuum cleaner 300 is located in the passenger compartment 402 in such manner that the hose connector 330 points toward the rear of the vehicle. The collector module 304 is arranged in the side-by-side position immediately adjacent to the vacuum module 302, as described in detail previously. The vacuum module 302 is located forward of the collector module 304 with respect to the automobile 400. That is, the vacuum module 302 faces the front end of the automobile 400 and the collector module 304 faces the rear end of the automobile 400. Each of the axes A1 and A2 is disposed transverse, and preferably perpendicular to the longitudinal axis A3, i.e., the axis along the direction of forward motion, of the automobile 400. Thus, the axis of the impeller assembly 62, which extends along the axes A2 of the vacuum module 302, is disposed transverse to the longitudinal axis A3 of the automobile 400.

A tray 412 may be disposed in the top opening 410 and covers the vacuum cleaner 300. The tray 412 is removable from the top opening 410 to provide access to the vacuum cleaner 300 when desired. In this arrangement, the tray 412 rests on one or more peripheral ledges 414 along an inner periphery of the interior of the center console 402. Other arrangements for removably securing the tray 412 in the top opening 410 may be provided. Further, the center console 404 may include a lid 416 to cover the top opening 410 and the tray 412. The lid 416 may form an armrest for the passengers in the adjacent seats 406, 408, and be coupled with hinges to the remaining portion of the center console 404 to allow for easily opening the lid 416 and providing access to the tray 412 and the vacuum cleaner 300 when desired.

Turning to FIGS. 16-19, a rear side 418 of the center console 404 is visible from the back passenger seats of the automobile 400 looking forward in the automobile. A storage compartment 420 is located on the rear side of the center console 404. The storage compartment 420 may be an integral part of the center console 404 or it may be a separate compartment placed adjacent to the center console 404. The storage compartment 420 has an opening 422 facing the rear of the automobile 400. The hose connector 330 projects into the storage compartment 420 from the rear side of the vacuum cleaner 300 through a front wall of the compartment.

Figure 18:
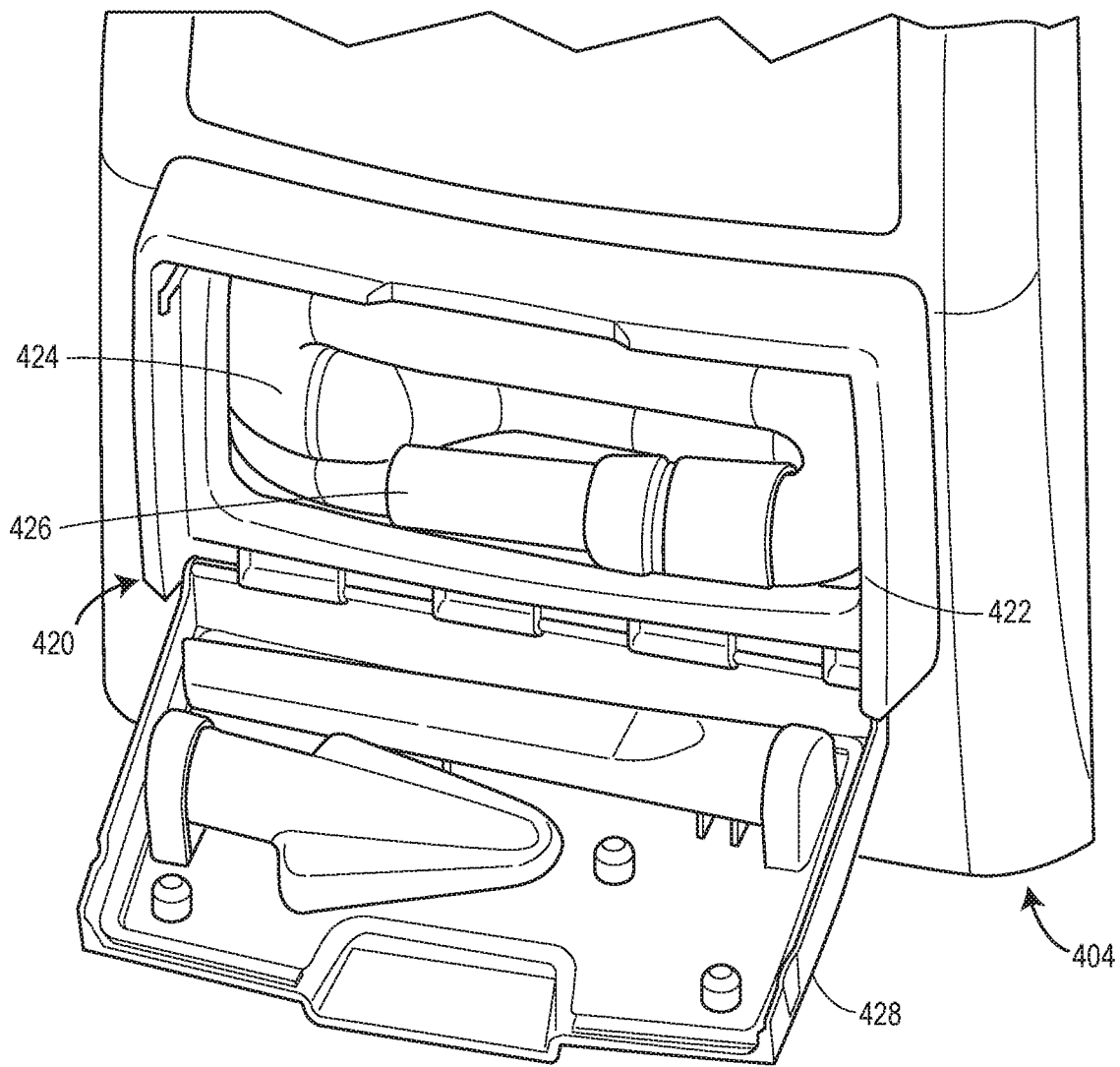
FIG. 18 is a rear isometric view of a portion of the console of FIG. 17 with the compartment door opened and a vacuum hose stored in the hose storage compartment.

As depicted in FIG. 18, a vacuum hose 424 is removably stored inside the storage compartment 420. One end of the vacuum hose 424 is operatively connected to the hose connector 330 (not shown). Optionally, a nozzle or other vacuum attachment 426 may be attached to the other end of the vacuum hose 424. The vacuum hose can be coiled up and stored inside of the storage compartment 420.

Figure 19:
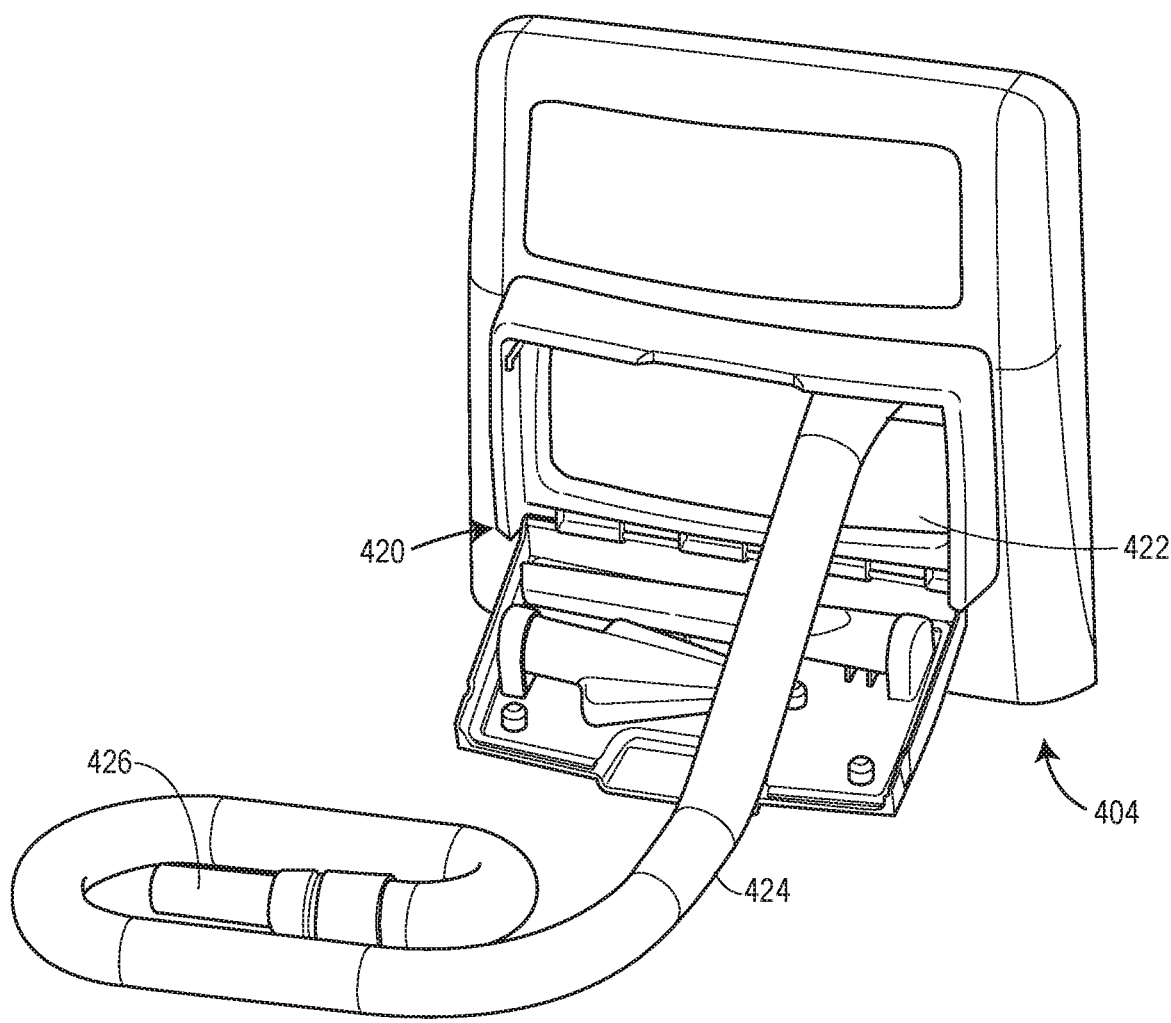
FIG. 19 is another rear isometric view of a portion of the console of FIG. 17 with the compartment door opened and the vacuum hose extending out of the hose storage compartment.
Figure 20:
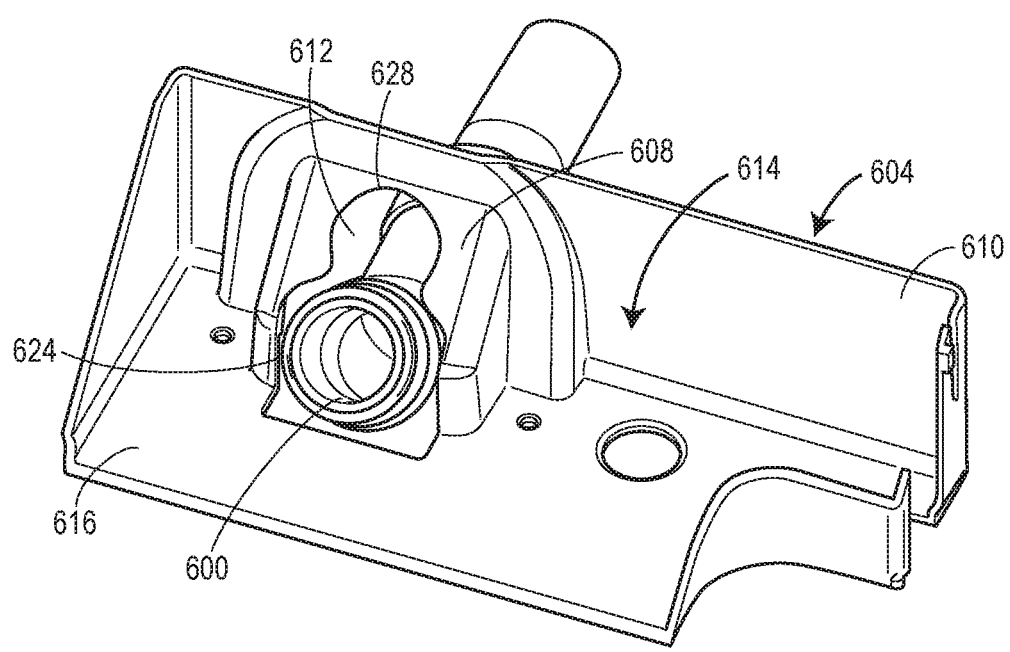
FIG. 20 is a top isometric view of console liner and hose fitting prior to attaching the hose fitting to the collector housing.
Figure 21:
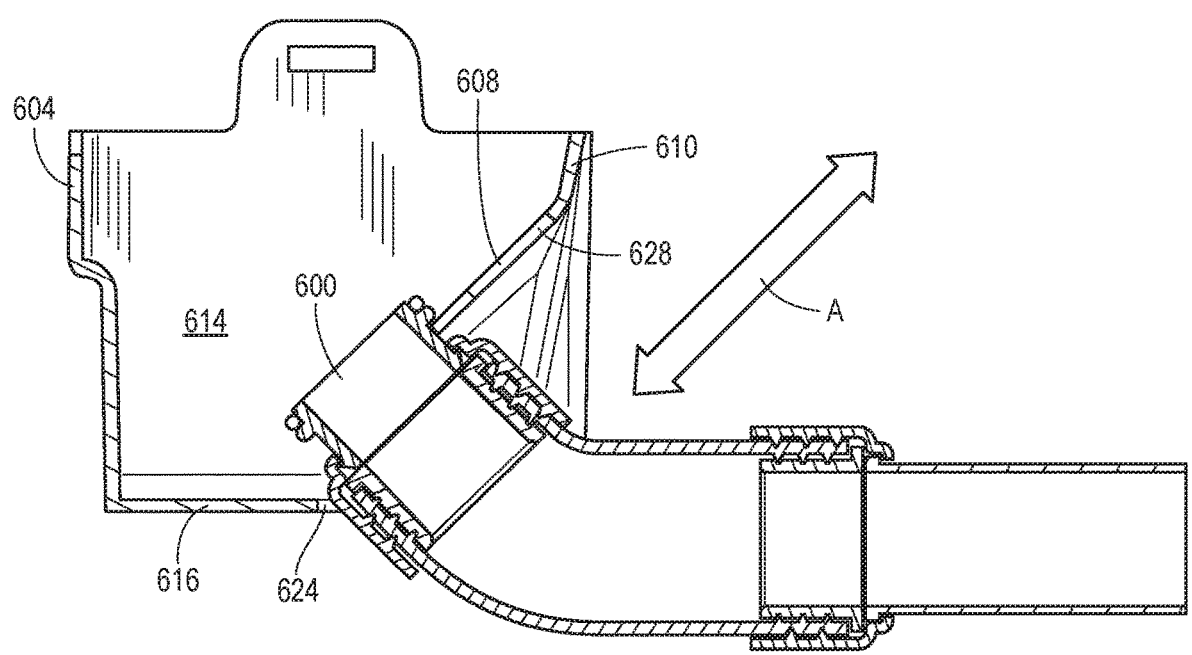
FIG. 21 is a cross-sectional view of the hose fitting and collector housing of FIG. 20.
Figure 22:
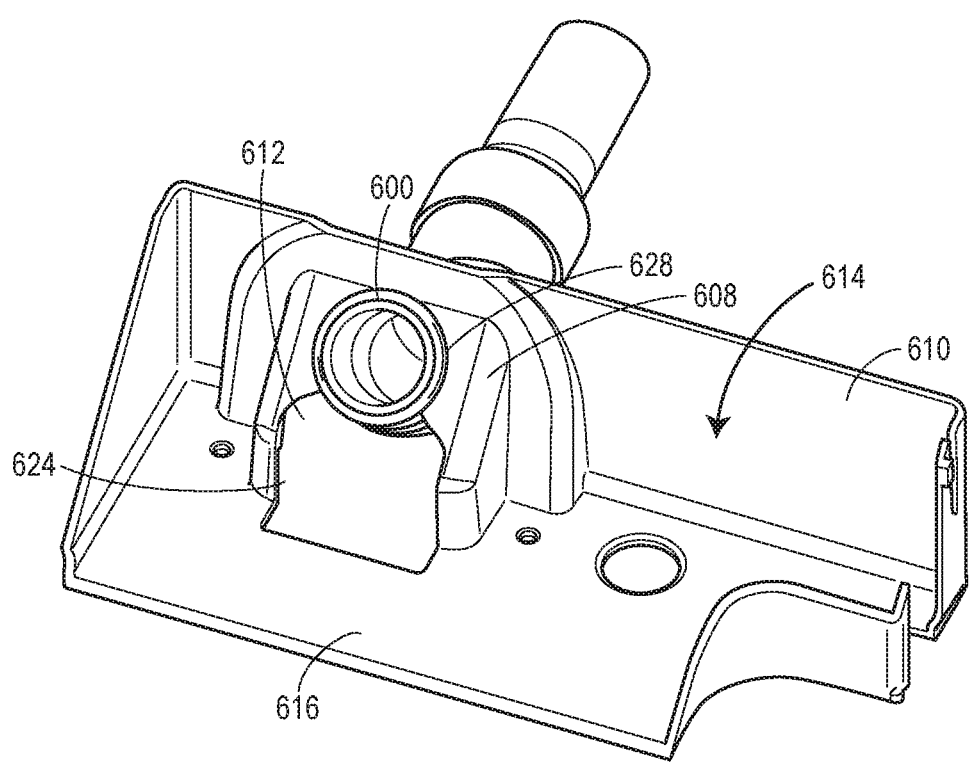
FIG. 22 is a partial top isometric view of the hose fitting attached to the collector housing of FIG. 20.
Figure 23:
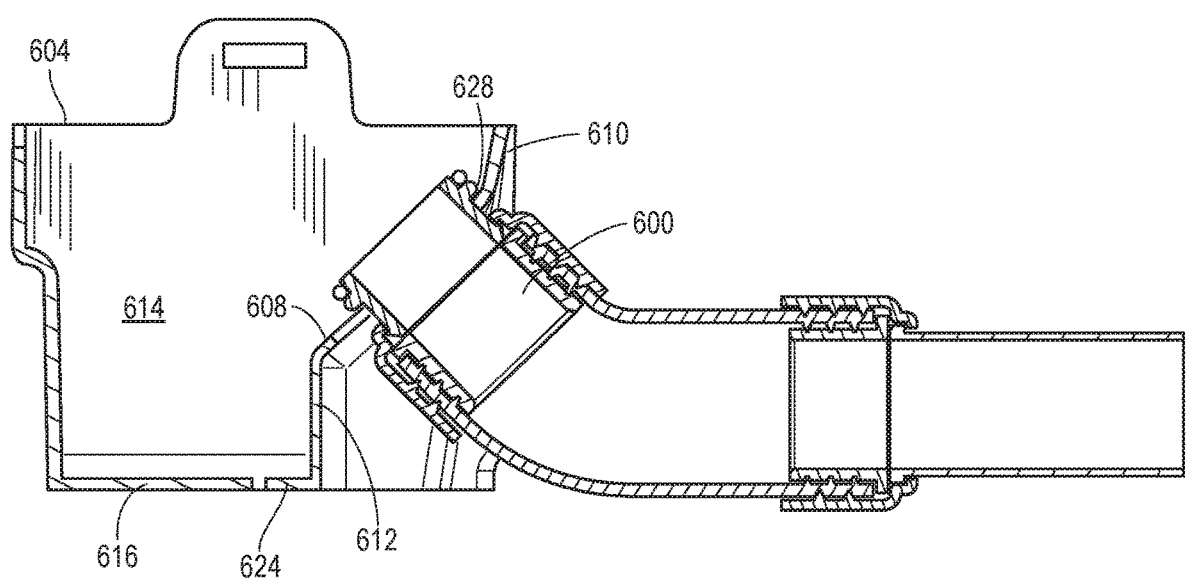
FIG. 23 is a cross-sectional view of the hose fitting attached to the collector housing of FIG. 52.

Referring now to FIG. 19, when it is desired to use the vacuum cleaner 300, a user can pull the vacuum hose 424 out of the vacuum compartment 420 in the usual manner. By locating the vacuum cleaner 300 and the vacuum hose 424 in a central area of the passenger compartment 402, it may be possible to reach all of the areas of the interior of the passenger compartment 402 with a shorter vacuum hose 424 than would be necessary if the vacuum cleaner was located at other locations in the vehicle. Further, with the storage compartment 420 and the opening 422 facing the rear of the automobile 400 and located forward of the rear passenger seats, it may be easier for a passenger in the rear passenger seats to operate the vacuum cleaner 300 and the vacuum hose 424. This may provide for easier and/or safer vacuuming of the passenger compartment 402 by passenger.

Figure 17:
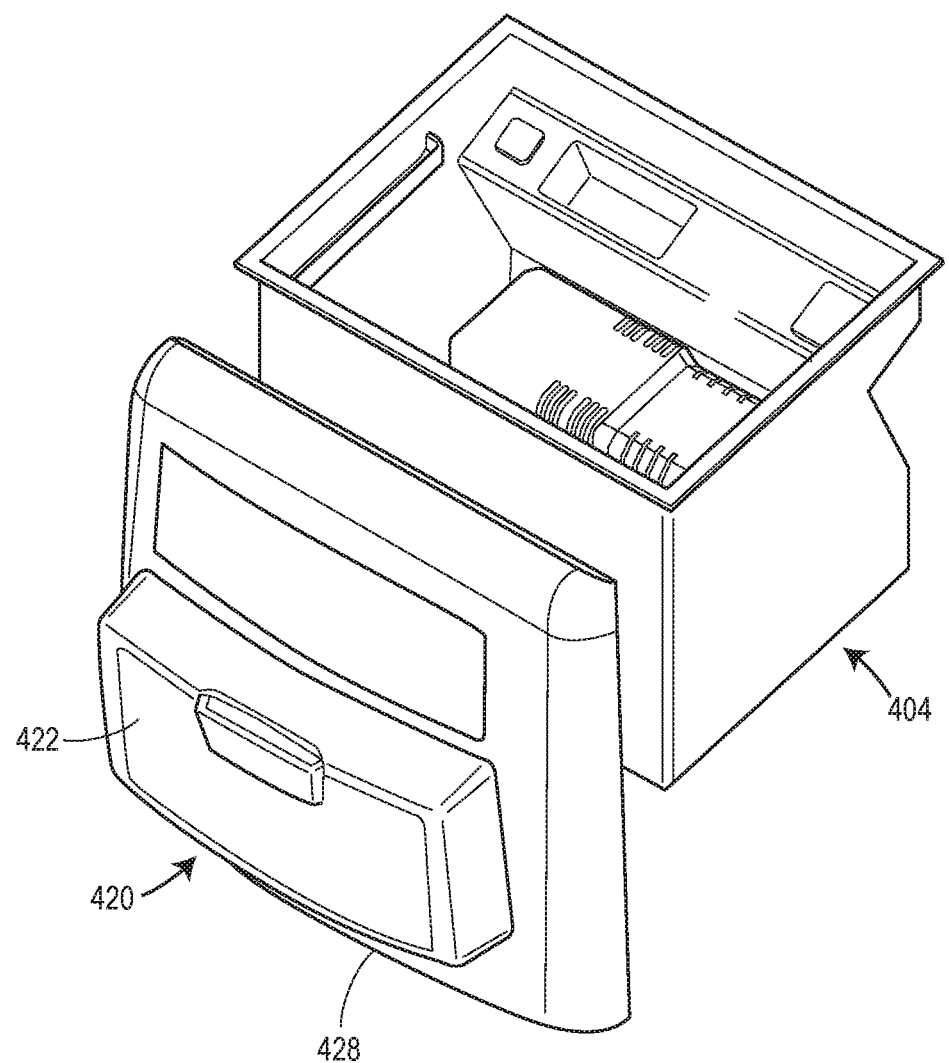
FIG. 17 is a rear isometric view of the console showing a hose storage compartment with a compartment door closed.

As depicted in FIG. 17, a door panel 428 removably covers the opening 422 into the storage compartment 420. The door panel 428 can be removably secured and locked to the storage compartment 420 in the closed position shown in FIG. 17, for example with latches, snap fit brackets, and the like. Similarly, and as depicted in FIG. 18, the door panel 428 can be unlocked and removed from the storage compartment 420 to provide access into the interior of the storage compartment 420. In this way, when it is desired to use the vacuum cleaner 300, a user can easily remove the door panel 428 from the opening 422 in order to access the vacuum hose 424. When the user is finished using the vacuum cleaner 300, the vacuum hose 424 can be coiled up and stored inside the storage compartment 420, and the door panel 428 can be re-attached to the storage compartment to again close the opening 422.

In addition, when the door panel 428 of the storage compartment 420 is open to provide access to the vacuum hose 424, for example, air (such as cooling air) may be exhausted into the storage compartment 420. For example, air drawn from the debris canister may be exhausted into the storage compartment 420, such as when the vacuum cleaner 300 is in use.

A toolholder may be located inside the storage compartment 420. The toolholder is configured to hold one or more tools in a predefined location inside the storage compartment 420. For example, the toolholder may be configured to hold the vacuum attachment 426 or some other vacuum accessory.

The motor 60 of the motor/impeller unit 57 can be powered by any sufficient electrical source, such as a battery that is part of the vacuum cleaner or may be connected to the electrical system of the vehicle.

Figure 24:
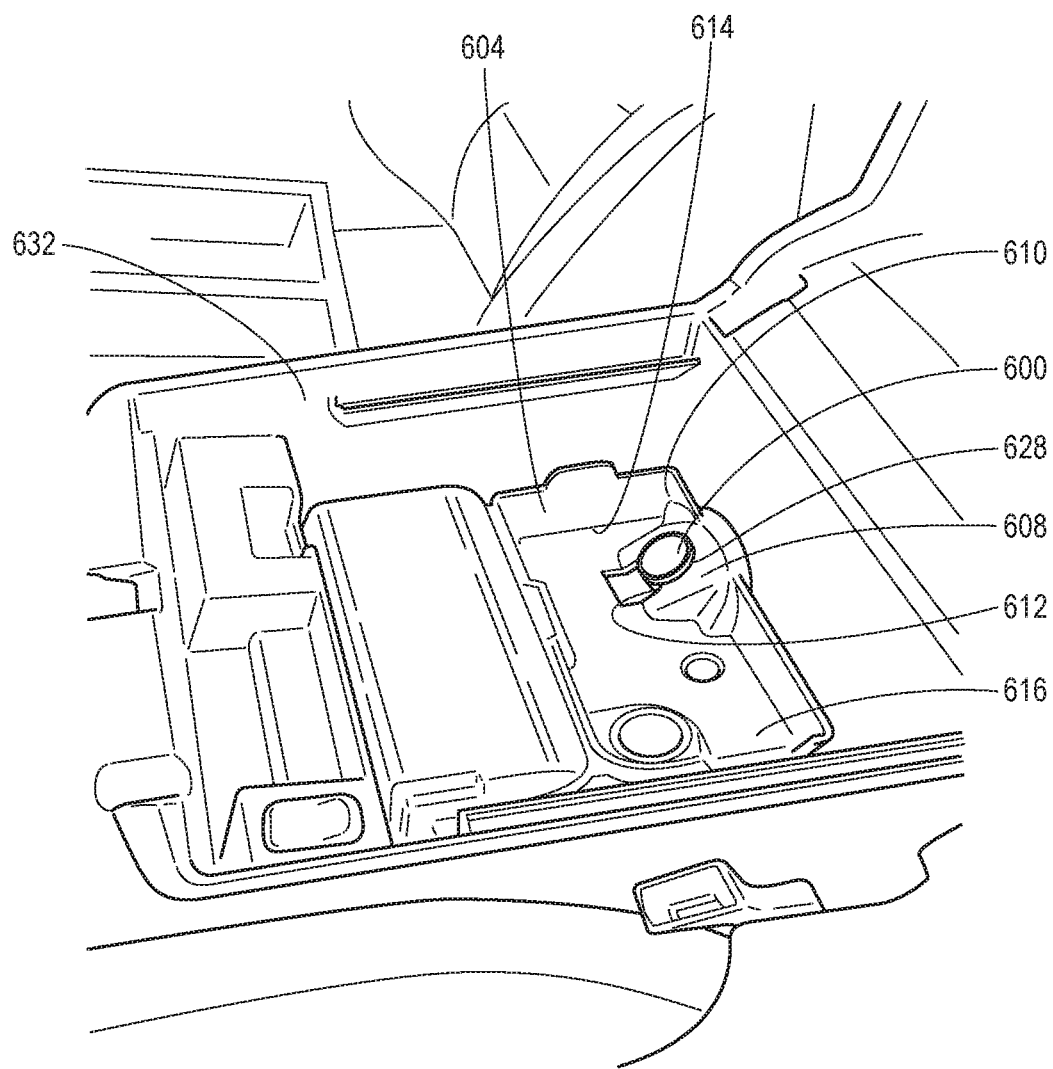
FIG. 24 is a top isometric view of the hose fitting attached to a collector housing with a debris canister removed to show interior portions of the hose fitting and collector housing.

FIGS. 20 through 24 illustrate a different embodiment of a hose fitting 600 removably attached to a collector housing 604 of a console. The collector housing 604 is illustrated without a debris canister, such as the debris canister 310 of FIGS. 8 and 14. The collector housing 604 includes a slanted undercut 608 disposed in one of the peripheral side walls 610. A key-slot 612 is formed in the slanted undercut 608 and a bottom wall 616 of the collector housing 604. The slanted undercut 608 extends into the inner space 614 of the collector housing 604. A lower portion 624, such as a receiving portion, of the key-slot 612 provides a receiving aperture to receive the hose fitting 600. The hose fitting 600 is configured to slide in a direction parallel to arrow A, which follows the slant of the undercut 608, until the hose fitting 600 snaps into an upper portion 628, such as an attachment portion, of the key-slot 612. When the hose fitting 600 snaps into the upper portion 628 of the key-slot 612, the hose fitting 600 attaches to the collector housing 604. In FIG. 24, the collector housing 604 is disposed within a center console 632 of a vehicle between two seats of the vehicle. The collector housing 604 is shown without a console cover and debris canister covering to illustrate the hose fitting 600 snapped into the upper portion 628 of the key-slot 612 and attached to the housing 604. So configured, the relationship of the collector housing 604 and hose fitting 600 reduces the axial length of space required in a vehicle console to install a vacuum hose.

Figure 25:
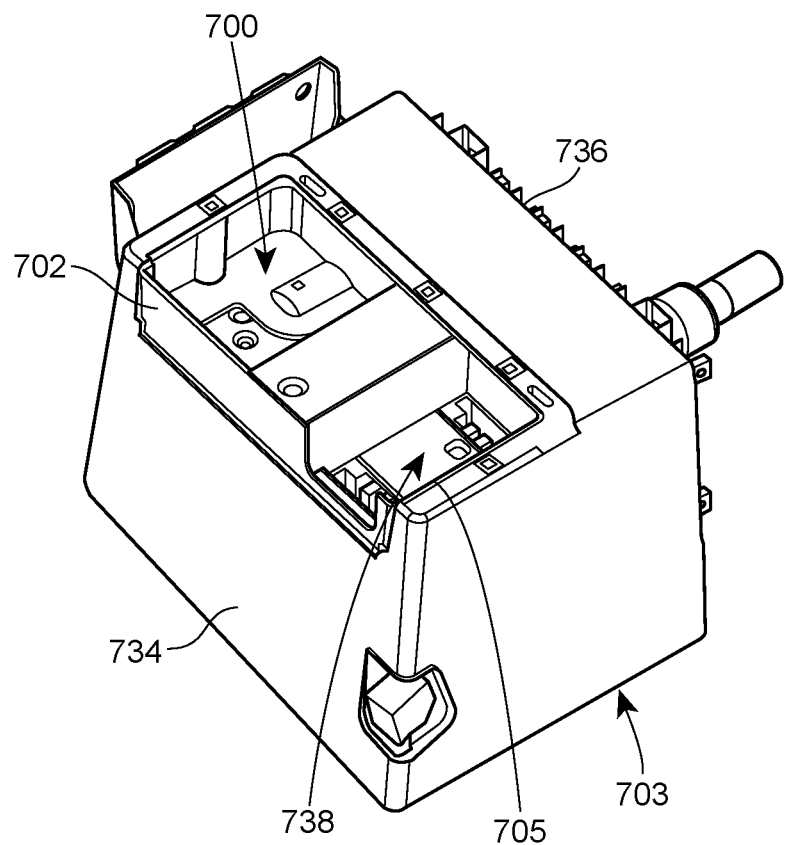
FIG. 25 is bottom isometric view of a console having a vacuum cleaner according to another aspect of the present disclosure disposed therein.
Figure 26A:
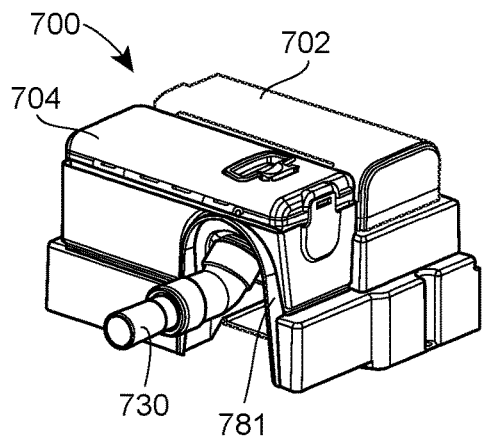
FIG. 26A is a isometric view of the vacuum cleaner of FIG. 25.
Figure 26B:
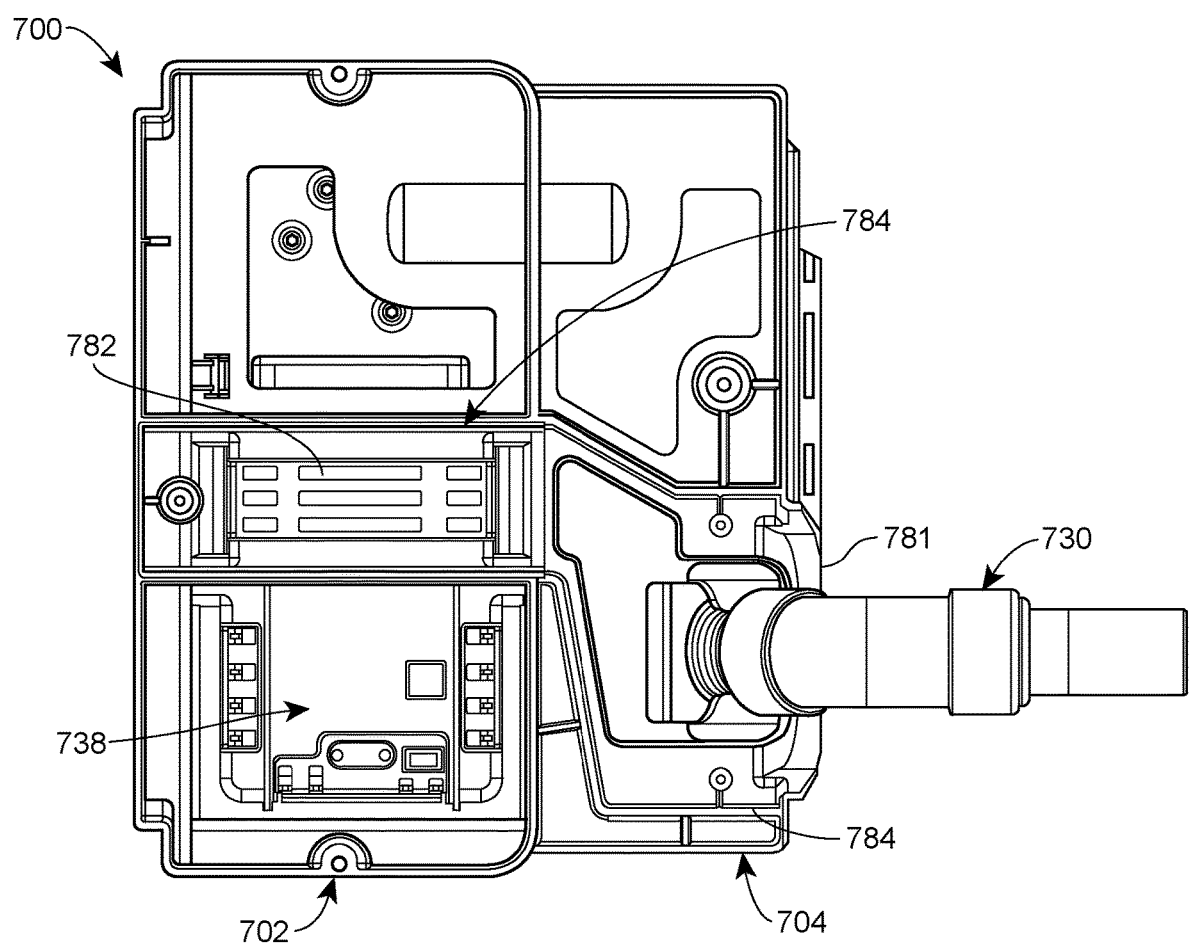
FIG. 26B is bottom view of the vacuum cleaner of FIG. 26A.
Figure 27:
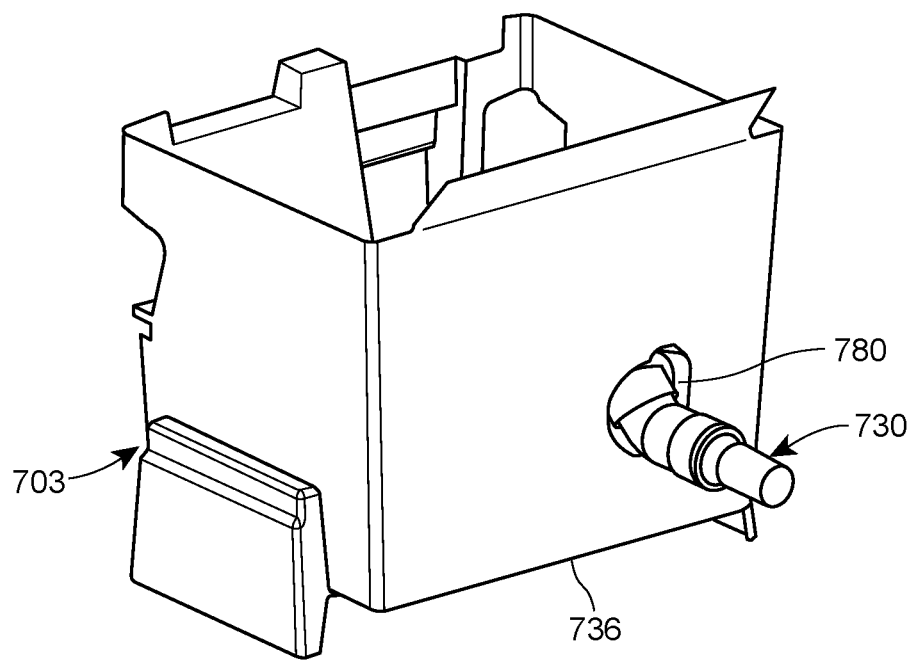
FIG. 27 is a rear isometric view of the console of FIG. 25.

Referring now to FIGS. 25-27, an alternative console 703 with a vacuum cleaner 700 disposed therein is depicted. The vacuum cleaner 700 includes all of the same parts as the previously described vacuum cleaners 50, 300, for example. As such, additional description regarding the same parts for the vacuum cleaner 700 is not provided again for the sake of brevity. Unlike the previously described consoles, the console 703 includes additional openings that enable an additional cool air flow path to the vacuum cleaner 700 and an exhaust flow path adjacent the hose connector, as described more below.

More specifically, and referring now to FIG. 25, the console 703 includes a first portion 734, such as a front portion, adapted to face a front area of the automobile and a second portion 736, such as a rear portion, adapted to face a rear area of the automobile. A vacuum cleaner 700 having a vacuum module 702 and a collector module 704 coupled thereto is disposed within the console 703. An underside of the console 703 includes a cooling opening 705 that receives fresh cooling air being pulled from below the console 703. In one example, the fresh cooling air is constantly being drawn into the cooling opening 705 of the console 703. The vacuum module 702 also includes a cooling recess 738 disposed on an underside of the motor housing adjacent to one or more of a printed circuit board or another portion of the motor (not shown), for example. So configured, cooling air being drawn from below the console 703 enters the cooling opening 705 of the console 703 and passes into the cooling recess 738 of the vacuum module 702 to help cool the printed circuit board and/or other part or parts of the motor disposed within the vacuum module 702. In addition, fresh working vacuum air enters through the hose connector 730 and gathers with the cooling air disposed in the cooling recess 738, for example.

Referring now to FIGS. 26A and 26B, a perspective view and a bottom view, respectively, of the vacuum cleaner 700 are depicted. As depicted in FIG. 26B, cooling air is being drawn into the cooling recess 738 of the vacuum module 702 and working vacuum air is also being drawn into the cooling recess 738 through the hose connector 730. The cooling air source is separate from the working air source being drawn through the hose connector 730. Having both the cooling air and the working air being drawn into the cooling recess 738 and over an enclosed printed circuit board (not shown) and other motor parts allows such parts to be more effectively cooled before air is exhausted out of the motor.

Referring now to FIG. 27, the console 703 further includes an exhaust opening 780 through which warm air is exhausted. In particular, the rear portion 736 of the console 704 further includes the exhaust opening 780, which is disposed adjacent to the hose connector 730. In addition, the vacuum cleaner 700 also includes an exhaust opening through which the warm air is exhausted. So configured, warm air is directed out of the exhaust opening of the vacuum cleaner 700 and into the exhaust opening 780 of the console 703.

For example, and as depicted in FIG. 26B, warm air from the motor of the vacuum module 702 may be directed out of the vacuum module 702 through vents 782 and into a duct 784. The duct 784 is separate from the cooling recess 738 disposed on the underside of the vacuum module 702. This prevents the warm air exiting the vacuum module 702 from mixing with one or more of the cooling air and vacuum working air disposed in the cooling recess 738 adjacent to the duct 784. As further depicted in FIG. 26B, the duct 784 is positioned on an underside of the vacuum module 702 and extends into an underside of the collector module 704 into the exhaust opening 780. So configured, the exhaust air exiting the vacuum module 702 is directed into the duct 784 and then through the exhaust opening of the vacuum cleaner and the exhaust opening 780 of the console 703 into the environment. Said another way, a flow path of exhaust air from the vacuum module 702 and into an exhaust opening adjacent to a hose connector is separate from any flow path of cooling air entering into the cooling recess 738, for example.

The particular shapes and sizes of the collector modules, the vacuum modules, and the interconnecting ducts, may be modified to conform to many different space configurations as may be dictated by the shapes and sizes of the components within the vehicle and/or decorative design considerations. Typically, it is anticipated that the vacuum cleaners will be configured for installation within the passenger and/or cargo compartment of a vehicle. However, the vacuum cleaners could be configured for installation in other areas of a vehicle as well.

A vacuum cleaner according to some aspects of the present disclosure provides an assembly that may be easily configured to conform to different spaces within a vehicle. The modular nature of the vacuum cleaners according to some aspects of the present disclosure allows a single vacuum cleaner to be assembled in different arrangements for different vehicle configurations. Additional and/or alternative functional benefits of vacuum cleaners according to various aspects of the present disclosure will be apparent to the person of ordinary skill.

The technical examples described and shown in detail herein are only exemplary of one or more aspects of the teachings of the present disclosure. Additional aspects, arrangements, and forms within the scope of the appended claims and all technically operative combinations of features disclosed herein are contemplated, the rights to which are expressly reserved.

What is claimed:

1. A vacuum cleaner configured to be mounted in a vehicle, comprising:
  a vacuum module configured to draw a vacuum, wherein the vacuum module includes a motor/impeller unit disposed within a motor housing; and
  a collector module separate from the vacuum module and configured to collect debris from air drawn by the vacuum module, wherein the collector module includes a collector housing attached to the motor housing and a debris canister removably disposed in the collector housing;
  wherein the collector module is disposed side by side adjacent to the vacuum module; and
  wherein the collector housing has a circumferential side wall defining an opening into an interior space, and the debris canister slides into an operative position in the interior space the collector housing through the opening.

2. The vacuum cleaner of claim 1, and the collector housing further comprising:
  a hose connector projecting outwardly from the side wall of the collector housing; and
  an interconnecting duct projecting from the side wall of the collector housing, wherein the interconnecting duct fluidly connects the collector housing with the motor/impeller unit.

3. The vacuum cleaner of claim 2, wherein one or more of the hose connector is disposed on an opposite side of the collector housing from the vacuum module or the interconnecting duct is disposed on an opposite side of the collector housing from the hose connector.

4. The vacuum cleaner of claim 2, the debris canister further comprising:
  a peripheral side wall extending from a wall and defining an interior space;
  a dirty air intake port through a first slanted overhang section of the side wall; and
  a clean air exhaust port through a second slanted overhang section of the side wall;
  wherein the first slanted overhang section fluidly mates to the hose connector, and
  wherein the second slanted overhang section fluidly mates to the interconnecting duct.

5. The vacuum cleaner of claim 4, wherein a sidewall of the collector housing comprises:
  a first slanted shoulder portion, the hose connector projecting from the first slanted shoulder portion; and
  a second slanted shoulder portion, the connector duct projecting from the second slanted shoulder portion;
  wherein the first slanted overhang section of the debris canister sidewall mates on the first slanted shoulder portion of the collector housing sidewall; and
  wherein the second slanted overhang section of the debris canister sidewall mates on the second slanted shoulder portion of the collector housing sidewall.

6. The vacuum cleaner of claim 4, wherein the first and second slanted overhang portions and the first and second slanted shoulder portions are slanted at an angel of about forty five degrees from vertical portions of the respective sidewalls.

7. The vacuum cleaner of claim 5, wherein an exterior side of the debris canister sidewall defines a first vertical recess extending from the first slanted overhang to the wall, and wherein an exterior side of the debris canister sidewall defines a second vertical recess extending from the second slanted overhang to the wall;
  wherein the first slanted shoulder slides up into the first vertical recess and the second slanted shoulder slides up into the second vertical recess as the debris canister slides into the operative position inside the collector housing.

8. The vacuum cleaner of claim 5, further comprising at least one of:
  a first gasket that forms a seal around the dirty air intake port between the first slanted shoulder and the first slanted overhang; and
  a second gasket that forms a seal around the clear air exhaust port between the second slanted shoulder and the second slanted overhang.

9. The vacuum cleaner of claim 4, further comprising a screen covering the clean air exhaust port.

10. The vacuum cleaner of claim 1, further comprising:
  a bracket that attaches the collector housing to the motor housing, wherein the bracket is one or more of coupled to a wall of the collector housing or part of the motor housing.

11. A vacuum cleaner comprising:
  a vacuum module configured to draw a vacuum, wherein the vacuum module includes a motor/impeller unit disposed within a motor housing; and
  a collector module separate from the vacuum module and configured to collect debris from air drawn by the vacuum module, wherein the collector module includes a collector housing attached to the motor housing and a debris canister removably disposed in the collector housing;
  wherein the motor housing and the collector housing are adapted to be disposed within a console of an automobile.

12. The vacuum cleaner of claim 11, wherein one or more of the collector module is disposed side by side adjacent to the vacuum module or the vacuum module is disposed forward of the collector module with respect to the automobile.

13. The vacuum cleaner of claim 11, wherein the motor/impeller unit extends along an axis of the impeller assembly, and the axis of the impeller assembly is disposed transverse to the forward direction of the automobile.

14. The vacuum cleaner of claim 11, wherein the collector housing has a circumferential side wall defining an accessible portion opening into an interior space, and the debris canister slides into an operative position in the interior space of the collector housing through the accessible portion.

15. The vacuum cleaner of claim 11, wherein the vacuum cleaner is accessible through an accessible opening of the console, and wherein the debris canister slides out of the collector housing and the accessible opening of the console.

16. The vacuum cleaner of claim 11, wherein the collector housing further comprises a slanted undercut and a key-slot formed in the slanted undercut, the key-slot having a receiving aperture to receive a hose fitting, and an attachment portion into which the hose fitting slides to attach the hose fitting to the collector housing.

* * * * *